United States Patent
Xie et al.

(10) Patent No.: US 11,086,835 B2
(45) Date of Patent: Aug. 10, 2021

(54) UPDATING AND QUERYING A BITMAP INDEX

(71) Applicant: Ant Financial (Hang Zhou) Network Technology Co., Ltd., Hangzhou (CN)

(72) Inventors: Zhenjiang Xie, Hangzhou (CN); Yuzhong Zhao, Hangzhou (CN)

(73) Assignee: ANT FINANCIAL (HANG ZHOU) NETWORK TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/164,761

(22) Filed: Feb. 1, 2021

(65) Prior Publication Data

US 2021/0149859 A1    May 20, 2021

Related U.S. Application Data

(63) Continuation of application No. 16/818,476, filed on Mar. 13, 2020, now Pat. No. 10,909,101, which is a
(Continued)

(30) Foreign Application Priority Data

Apr. 19, 2019 (CN) .......................... 201910321209.0

(51) Int. Cl.
*G06F 17/00* (2019.01)
*G06F 16/22* (2019.01)
*G06F 16/245* (2019.01)

(52) U.S. Cl.
CPC ...... *G06F 16/2237* (2019.01); *G06F 16/2272* (2019.01); *G06F 16/2282* (2019.01); *G06F 16/245* (2019.01)

(58) Field of Classification Search
CPC ............... G06F 16/2237; G06F 16/245; G06F 16/2272; G06F 16/2282
See application file for complete search history.

(56) References Cited

U.S. PATENT DOCUMENTS 5,884,307 A * 3/1999 Depledge ................ G06F 16/22
6,266,662 B1    7/2001 Ozbutun et al.
(Continued)

FOREIGN PATENT DOCUMENTS

CN    103678556    3/2014
CN    103714090    4/2014
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Tyler J Torgrimson
(74) *Attorney, Agent, or Firm* — Fish & Richardson P.C.

(57) ABSTRACT

This disclosure relates to bitmap index writing, dumping, merging, and querying. In one aspect, a method includes determining, based on update data, a to-be-updated row of a bitmap index that indexes data of a database using a bitmap data structure. The to-be-updated row of the bitmap index is locked. The locking includes adding a row lock to the to-be-updated row, thereby preventing the to-be-updated row from being updated by other update operations. At least one other row of the bitmap index remains unlocked for updating by other update operations. Data in the to-be-updated row of the bitmap index is updated based on the update data.

24 Claims, 11 Drawing Sheets

Related U.S. Application Data continuation of application No. PCT/CN2020/071872, filed on Jan. 14, 2020.

(56) References Cited

U.S. PATENT DOCUMENTS

| | | |
|---|---|---|
| 9,703,787 B2 | 7/2017 | Ng et al. |
| 10,909,101 B2 | 2/2021 | Xie et al. |
| 2020/0334218 A1 | 10/2020 | Xie et al. |

FOREIGN PATENT DOCUMENTS

| | | |
|---|---|---|
| CN | 104065636 | 9/2014 |
| CN | 104866608 | 8/2015 |
| CN | 106874437 | 6/2017 |
| CN | 109165259 | 1/2019 |

OTHER PUBLICATIONS

Itpub.net [online], "Oracle Bitmap Index," Jan. 2018, retrieved on Apr. 15, 2020, retrieved from URL<http://blog.itpub.net/29654823/viewspace-2150299/>, 6 pages (with machine translation).
Nakamoto, "Bitcoin: A Peer-to-Peer Electronic Cash System," www.bitcoin.org, 2005, 9 pages.

\* cited by examiner

UPDATING AND QUERYING A BITMAP INDEX

CROSS-REFERENCE TO RELATED APPLICATIONS

This application is a continuation of U.S. application Ser. No. 16/818,476, filed Mar. 13, 2020, which is a continuation of PCT Application No. PCT/CN2020/071872, filed on Jan. 14, 2020, which claims priority to Chinese Patent Application No. 201910321209.0, filed on Apr. 19, 2019, and each application is hereby incorporated by reference in its entirety.

TECHNICAL FIELD

The present disclosure relates to the field of computer technologies, and in particular, to bitmap index writing, dumping, merging, and querying.

BACKGROUND

A bitmap index is a database index created based on a bitmap and is applicable to column query with a large number of duplicate values. In actual application scenarios, as data stored in a database is constantly updated, a bitmap index needs to be updated accordingly to satisfy a query demand.

At present, when updating the bitmap index, a data block in which a to-be-updated row is located will be locked as a whole. The data block usually includes hundreds of thousands of rows of data. Updating a single row in the bitmap index causes other unrelated rows of the whole data block to be locked, making it impossible to update other rows in the data block.

As a result, existing methods have low performance during concurrent updates.

SUMMARY

In view of the previous description, implementations of the present disclosure provide bitmap index writing/dumping/merging/querying methods and apparatuses, to improve performance during concurrent updates.

According to a first aspect, an implementation of the present disclosure provides a bitmap index writing method, including the following: determining a to-be-updated row of a bitmap index Memtable based on update data; adding a row lock to the to-be-updated row of the bitmap index Memtable; and updating data in the to-be-updated row of the bitmap index Memtable based on the update data.

According to a second aspect, an implementation of the present disclosure provides a bitmap index dumping method, including the following: determining a to-be-updated row of a bitmap index Memtable based on update data; adding a row lock to the to-be-updated row of the bitmap index Memtable; updating data in the to-be-updated row of the bitmap index Memtable based on the update data; releasing the row lock of the to-be-updated row of the bitmap index Memtable; and writing the data in the bitmap index Memtable into a new bitmap index dump SSTable.

According to a third aspect, an implementation of the present disclosure provides a bitmap index merging method, including the following: determining a to-be-updated row of a bitmap index Memtable and a to-be-updated row of a main table Memtable based on update data; adding row locks to the to-be-updated row of the bitmap index Memtable and the to-be-updated row of the main table Memtable; updating the data in the to-be-updated row of the bitmap index Memtable and updating the data in the to-be-updated row of the main table Memtable based on the update data; releasing the row lock of the to-be-updated row of the bitmap index Memtable and the row lock of the to-be-updated row of the main table Memtable; writing the data in the bitmap index Memtable into a new bitmap index dump SSTable, and writing the data in the main table Memtable into a new main table dump SSTable; and determining data in a bitmap index baseline SSTable based on the new main table dump SSTable.

According to a fourth aspect, an implementation of the present disclosure provides a bitmap index querying method, including the following: determining a to-be-updated row of a bitmap index Memtable and a to-be-updated row of a main table Memtable based on update data; adding row locks to the to-be-updated row of the bitmap index Memtable and the to-be-updated row of the main table Memtable; updating the data in the to-be-updated row of the bitmap index Memtable and updating the data in the to-be-updated row of the main table Memtable based on the update data; releasing the row lock of the to-be-updated row of the bitmap index Memtable and the row lock of the to-be-updated row of the main table Memtable; writing the data in the bitmap index Memtable into a new bitmap index dump SSTable, and writing the data in the main table Memtable into a new main table dump SSTable; writing the data in the new main table dump SSTable into a new main table baseline SSTable; determining data in a bitmap index baseline SSTable based on the new main table baseline SSTable, where the bitmap index Memtable, the new bitmap index dump SSTable, and the bitmap index baseline SSTable constitute one bitmap index; and performing query in one or more of the bitmap indices based on a query criterion to obtain a query result.

According to a fifth aspect, an implementation of the present disclosure provides a bitmap index writing apparatus, including the following: a determining unit, configured to determine a to-be-updated row of a bitmap index Memtable based on update data; a locking unit, configured to add a row lock to the to-be-updated row of the bitmap index Memtable; and an updating unit, configured to update data in the to-be-updated row of the bitmap index Memtable based on the update data.

According to a sixth aspect, an implementation of the present disclosure provides a bitmap index dumping apparatus, including the following: a determining unit, configured to determine a to-be-updated row of a bitmap index Memtable based on update data; a locking unit, configured to add a row lock to the to-be-updated row of the bitmap index Memtable; an updating unit, configured to update data in the to-be-updated row of the bitmap index Memtable based on the update data; a releasing unit, configured to release the row lock of the to-be-updated row of the bitmap index Memtable; and a dumping unit, configured to write the data in the bitmap index Memtable into a new bitmap index dump SSTable.

According to a seventh aspect, an implementation of the present disclosure provides a bitmap index merging apparatus, including the following: a determining unit, configured to determine a to-be-updated row of a bitmap index Memtable and a to-be-updated row of a main table Memtable based on update data; a locking unit, configured to add row locks to the to-be-updated row of the bitmap index Memtable and the to-be-updated row of the main table Memtable; an updating unit, configured to update data in the to-be-updated row of the bitmap index Memtable and data in the to-be-updated row of the main table Memtable based on the update data; a releasing unit, configured to release the row lock of the to-be-updated row of the bitmap index Memtable and the row lock of the to-be-updated row of the main table Memtable; a dumping unit, configured to write the data in the bitmap index Memtable into a new bitmap index dump SSTable, and write the data in the main table Memtable into a new main table dump SSTable; and a merging unit, configured to determine data in a bitmap index baseline SSTable based on the new main table dump SSTable.

According to an eighth aspect, an implementation of the present disclosure provides a bitmap index querying apparatus, including the following: a determining unit, configured to determine a to-be-updated row of a bitmap index Memtable and a to-be-updated row of a main table Memtable based on update data; a locking unit, configured to add row locks to the to-be-updated row of the bitmap index Memtable and the to-be-updated row of the main table Memtable; an updating unit, configured to update data in the to-be-updated row of the bitmap index Memtable and data in the to-be-updated row of the main table Memtable based on the update data; a releasing unit, configured to release the row lock of the to-be-updated row of the bitmap index Memtable and the row lock of the to-be-updated row of the main table Memtable; a dumping unit, configured to write the data in the bitmap index Memtable into a new bitmap index dump SSTable, and write the data in the main table Memtable into a new main table dump SSTable; a merging unit, configured to write the data in the new main table dump SSTable into a new main table baseline SSTable; and determine data in a bitmap index baseline SSTable based on the new main table baseline SSTable, where the bitmap index Memtable, the new bitmap index dump SSTable, and the bitmap index baseline SSTable constitute one bitmap index; and a query unit, configured to perform query in one or more of the bitmap indices based on a query criterion to obtain a query result.

The previous at least one technical solutions used in the implementations of the present disclosure can achieve the following beneficial effects: Based on the method, in the bitmap index update process, the row lock is added to the to-be-updated row of the bitmap index Memtable to implement row-level locking. Therefore, such methods can reduce the locking range, and prevent the data block in which the to-be-updated row is located from being locked, thereby improving the performance during concurrent updates of the bitmap indices.

BRIEF DESCRIPTION OF DRAWINGS

To describe the technical solutions in the implementations of the present disclosure or in the existing technology more clearly, the following briefly describes the accompanying drawings needed for describing the implementations or the existing technology. Clearly, the accompanying drawings in the following description show some implementations of the present disclosure, and a person of ordinary skill in the art can still derive other drawings from these accompanying drawings without creative efforts.

DESCRIPTION OF IMPLEMENTATIONS

To make the objectives, technical solutions, and advantages of the implementations of the present disclosure clearer, the following clearly describes the technical solutions in the implementations of the present disclosure with reference to the accompanying drawings in the implementations of the present disclosure. Clearly, the described implementations are some but not all of the implementations of the present disclosure. All other implementations obtained by a person of ordinary skill in the art based on the implementations of the present disclosure without creative efforts shall fall within the protection scope of the present disclosure.

Figure 1:
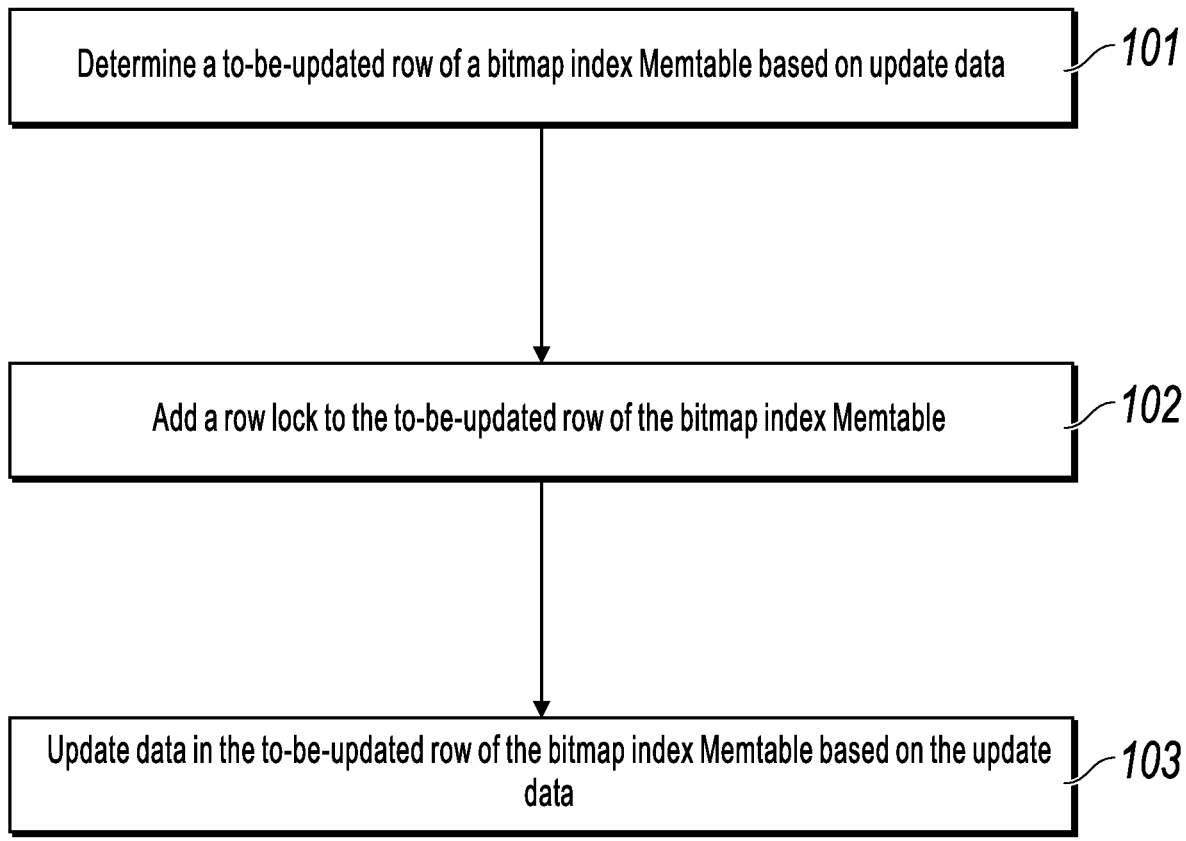
FIG. 1 is a flowchart illustrating a bitmap index writing method, according to an implementation of the present disclosure.
Figure 2:
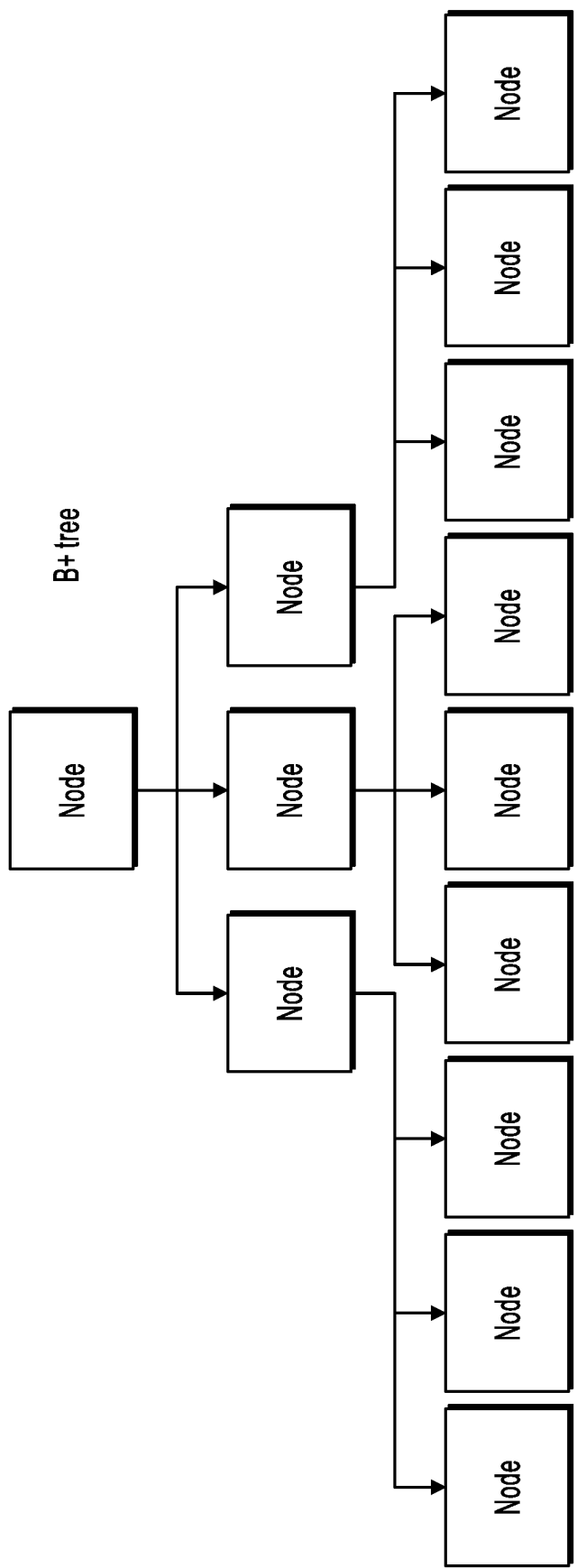
FIG. 2 is a schematic structural diagram illustrating a bitmap index Memtable, according to an implementation of the present disclosure.

As shown in FIG. 1, an implementation of the present disclosure provides a bitmap index writing method. The method can include the following steps:

Step 101: Determine a to-be-updated row of a bitmap index Memtable based on update data.

The bitmap index Memtable and a main table Memtable are storage structures that enable row-level locking, such as a B+ tree, a Bw tree, etc. The to-be-updated row of the bitmap index Memtable can be determined based on a main table primary key column and an index column (i.e., a primary key column of an index table), and a row lock can be added to the to-be-updated row.

Step 102: Add a row lock to the to-be-updated row of the bitmap index Memtable.

Step 103: Update data in the to-be-updated row of the bitmap index Memtable based on the update data.

Step 103 includes the following: determining a column value of a main table primary key column and a column value of an index column of the update data; and writing the column value of the main table primary key column and the column value of the index column of the update data into the to-be-updated row of the bitmap index Memtable.

Rows of the bitmap index Memtable store the column values of the index column and the main table primary key column, and are sorted based on these column values. FIG.

2 shows a bitmap index Memtable of a B+ tree structure, including multiple nodes, where leaf nodes store row data.

Figure 6:
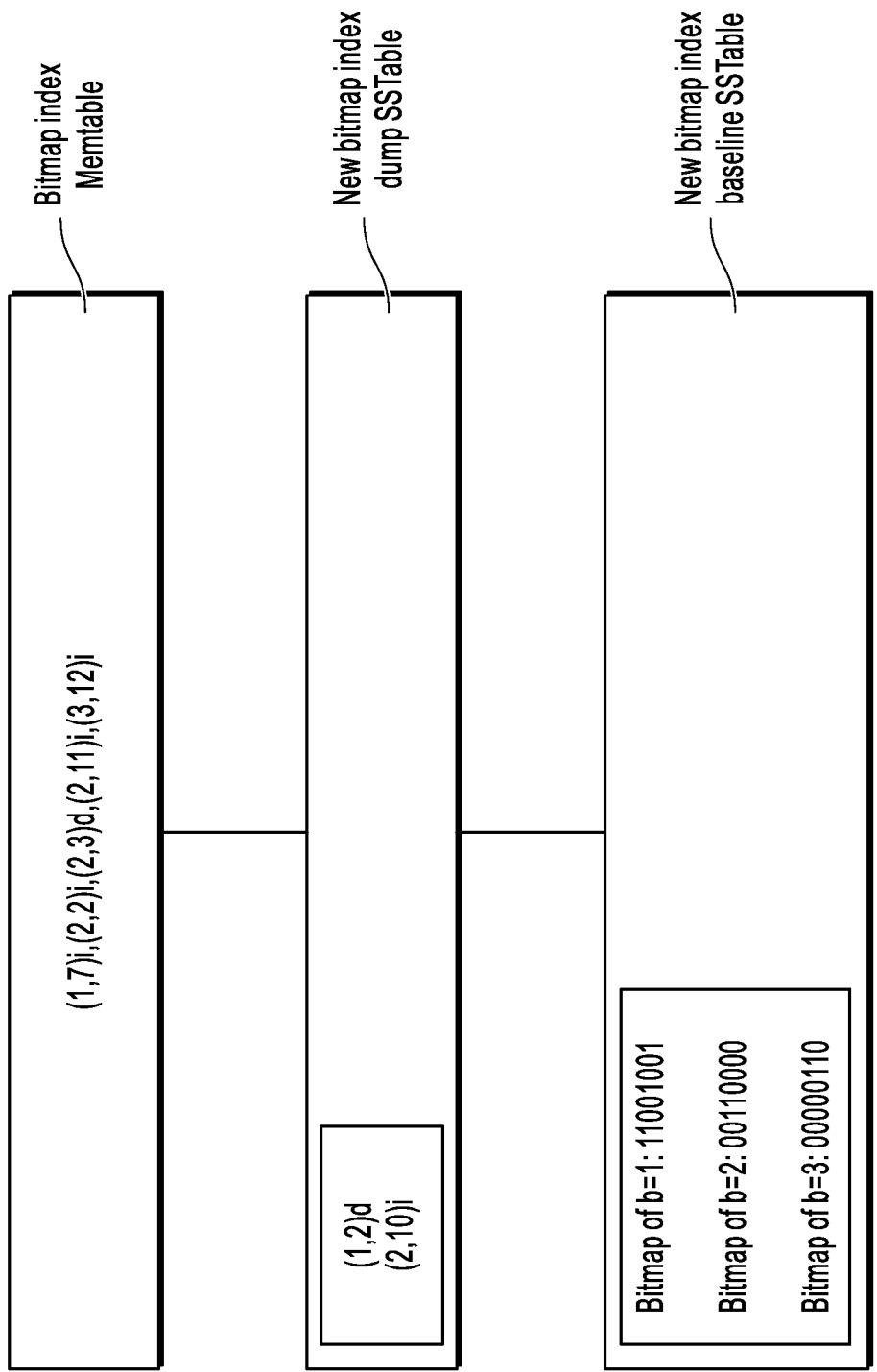
FIG. 6 is a schematic structural diagram illustrating a bitmap index, according to an implementation of the present disclosure.

For example, the main table field is (a, b), where "a" represents the main table primary key column, and "b" represents the index column (i.e., a bitmap index is created based on column b). Referring to FIG. 6, a storage order of the bitmap index Memtable is (b, a). In the figure, "i" represents insertion and "d" represents deletion.

In an actual application scenario, a bitmap index writing process can be implemented by executing a transaction, i.e., starting a transaction, performing step 101 to step 103, and submitting the transaction. After the transaction is submitted, that is, after the data update is completed, the method further includes the following: releasing the row lock of the to-be-updated row of the bitmap index Memtable.

Based on the method, in the bitmap index update process, the row lock is added to the to-be-updated row of the bitmap index Memtable to implement row-level locking. Therefore, such method can reduce the locking range, and prevent the data block in which the to-be-updated row is located from being locked, thereby improving the performance during concurrent updates of the bitmap indices.

The main table writing method is similar to the bitmap index writing method. The main table writing method includes the following:

a1: Determine a to-be-updated row of a main table Memtable based on update data.

a2: Add a row lock to the to-be-updated row of the main table Memtable.

a3: Update data in the to-be-updated row of the main table Memtable based on the update data.

Figure 5:
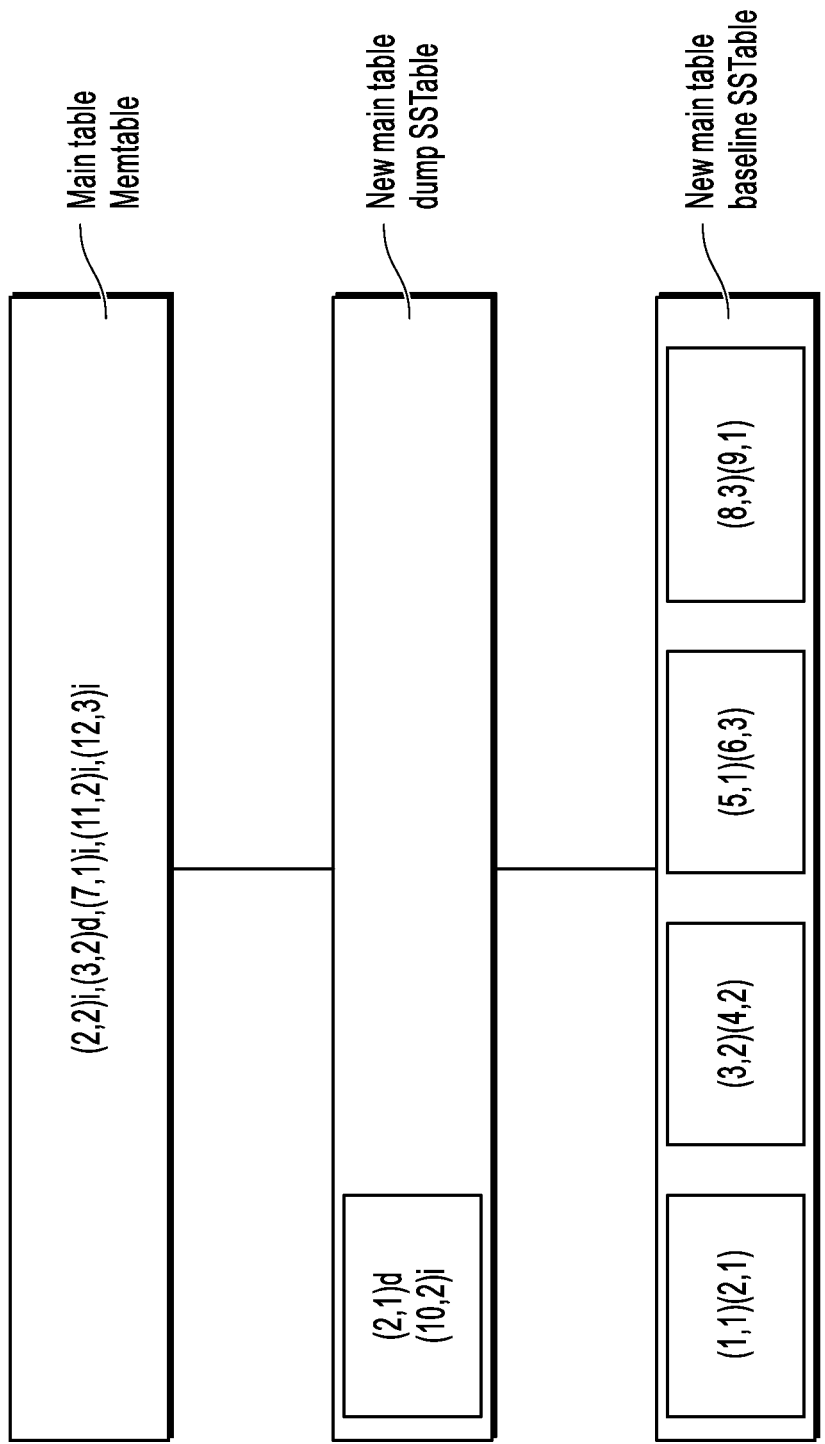
FIG. 5 is a schematic structural diagram illustrating a main table, according to an implementation of the present disclosure.

Unlike the bitmap index Memtable, the main table Memtable stores column values of all columns of the update data. In addition, in the main table Memtable, a data storage order is (a, b), as shown in FIG. 5.

It is worthwhile to note that, to ensure data consistency between the main table and the bitmap index, in the process of writing data into the main table or the bitmap index, row locks need to be added to both the main table and the bitmap index. However, after the locks are added, data can be first written into the main table, or can be first written into the bitmap index, or can be simultaneously written into the main table and the bitmap index. After the data writing for both the main table and the bitmap index is completed, the row locks added to the main table and the bitmap index are released.

In such case, step 102 includes the following: adding row locks to the to-be-updated row of the bitmap index Memtable and the to-be-updated row of the main table Memtable. The following step 302 is similar to step 102, and details are omitted here for simplicity.

Similarly, a2 includes the following: adding row locks to the to-be-updated row of the bitmap index Memtable and the to-be-updated row of the main table Memtable. The following c2 is similar to a2, and details are omitted here for simplicity.

Corresponding to the locking, unlocking includes the same processing procedure.

The following step 304 includes the following: releasing the row lock of the to-be-updated row of the bitmap index Memtable and the row lock of the to-be-updated row of the main table Memtable.

Figure 3:
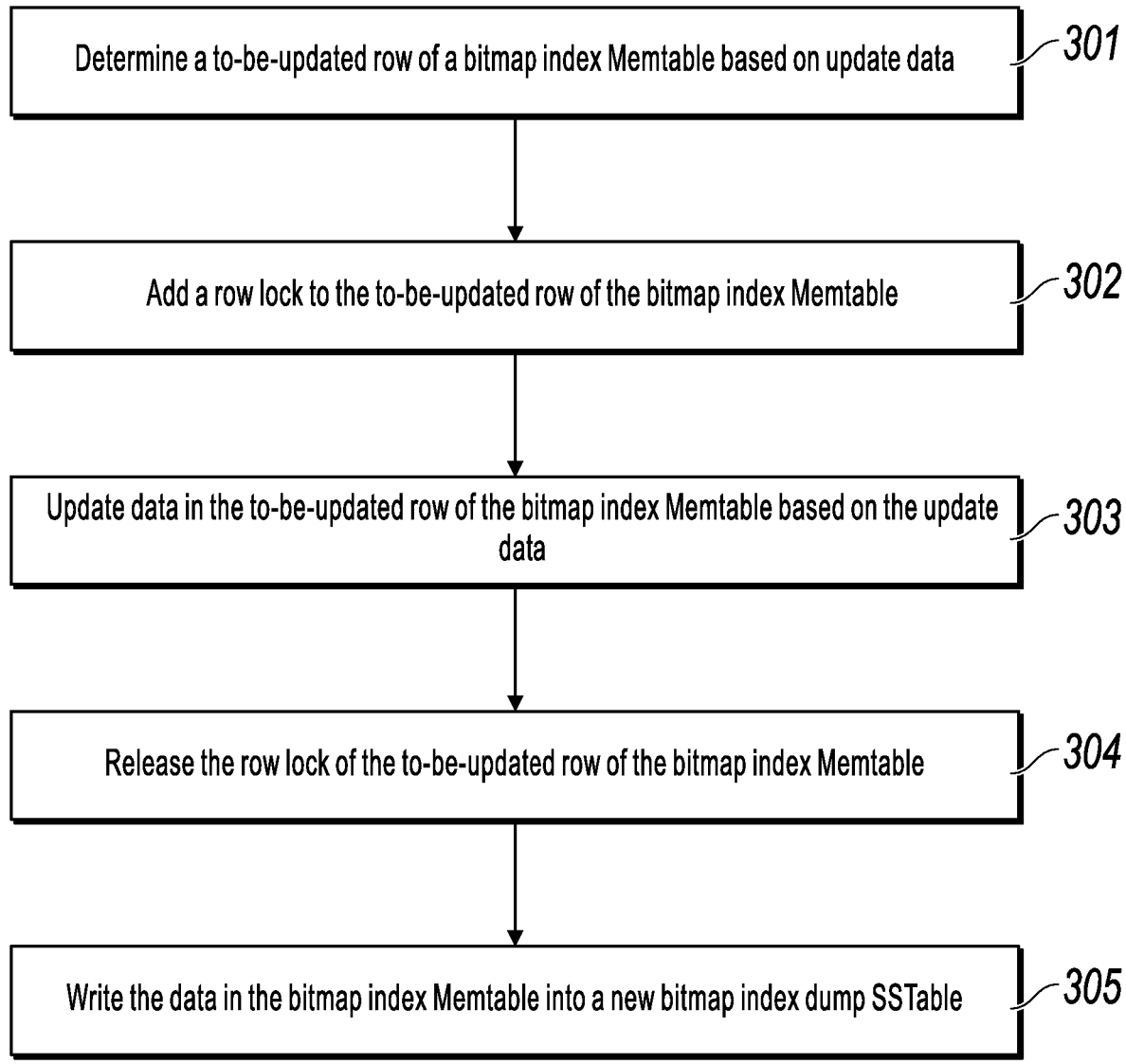
FIG. 3 is a flowchart illustrating a bitmap index dumping method, according to an implementation of the present disclosure.

The following c4 includes the following: releasing the row lock of the to-be-updated row of the bitmap index Memtable and the row lock of the to-be-updated row of the main table Memtable. As shown in FIG. 3, an implementation of the present disclosure provides a bitmap index dumping method, including the following:

Step 301: Determine a to-be-updated row of a bitmap index Memtable based on update data.

Step 302: Add a row lock to the to-be-updated row of the bitmap index Memtable.

Step 303: Update data in the to-be-updated row of the bitmap index Memtable based on the update data.

Step 301 to step 303 are the same as step 101 to step 103, and details are omitted here for simplicity.

Step 304: Release the row lock of the to-be-updated row of the bitmap index Memtable.

After the writing process is completed, the related row lock is released to cancel the occupation of resources.

Step 305: Write the data in the bitmap index Memtable into a new bitmap index dump SSTable.

The new bitmap index dump SSTable includes one or more macroblocks, and each macroblock includes some or all of data in the bitmap index field. Data is no longer updated once written.

A storage order of the new bitmap index dump SSTable is (b, a), as shown in FIG. 6.

The macroblock includes one or more rows of sorted data, and an amount of data stored in each macroblock can be preconfigured, for example, a size of the macroblock is 2M. The macroblock persists on a disk and is the basic constitution unit of an SSTable. SSTables include a dump SSTable and a baseline SSTable (main table, bitmap index).

Step 305 includes the following:

b1: Freeze the bitmap index Memtable.

Before the data in the bitmap index Memtable is dumped to the new bitmap index dump SSTable, the bitmap index Memtable needs to be frozen to prevent new data from being written into the bitmap index Memtable.

b2: Write the data in the frozen bitmap index Memtable into the new bitmap index dump SSTable in a macroblock format of the new bitmap index dump SSTable.

When there is no old bitmap index dump SSTable, the data in the frozen bitmap index Memtable is directly written into the new bitmap index dump SSTable in the macroblock format of the new bitmap index dump SSTable.

When there is an old bitmap index dump SSTable, b2 includes the following:

b21: Merge rows of the old bitmap index dump SSTable and the frozen bitmap index Memtable based on an index column and a main table primary key column.

The rows of the old bitmap index dump SSTable and the frozen bitmap index Memtable are iterated based on the main table primary key column and the index column, and the same rows are merged.

b22: Write the merged data into the new bitmap index dump SSTable in the macroblock format of the new bitmap index dump SSTable.

After b2, the bitmap index Memtable is unfrozen.

To alleviate impact on the writing of other update data, after b1 and before b2, the method can further include the following: creating a new bitmap index Memtable.

The main table dumping method is similar to the bitmap index dumping method. The main table dumping method includes the following:

c1: Determine a to-be-updated row of a main table Memtable based on update data.

c2: Add a row lock to the to-be-updated row of the main table Memtable.

c3: Update data in the to-be-updated row of the main table Memtable based on the update data.

c4: Release the row lock of the to-be-updated row of the main table Memtable.

c5: Write the data in the main table Memtable into a new main table dump SSTable.

The new main table dump SSTable includes one or more macroblocks, and each macroblock includes some or all of data in the main table field. Data is no longer updated once written. A storage order of the new main table dump SSTable is (a, b), as shown in FIG. 5.

c5 includes the following:

c51: Freeze the main table Memtable.

c52: Write the data in the frozen main table Memtable into the new main table dump SSTable in a macroblock format of the new main table dump SSTable.

c52 includes the following:

c521: Merge rows of the old main table dump SSTable and the frozen main table Memtable based on an index column and a main table primary key column.

c522: Write the merged data into the new main table dump SSTable in the macroblock format of the new main table dump SSTable.

Figure 4:
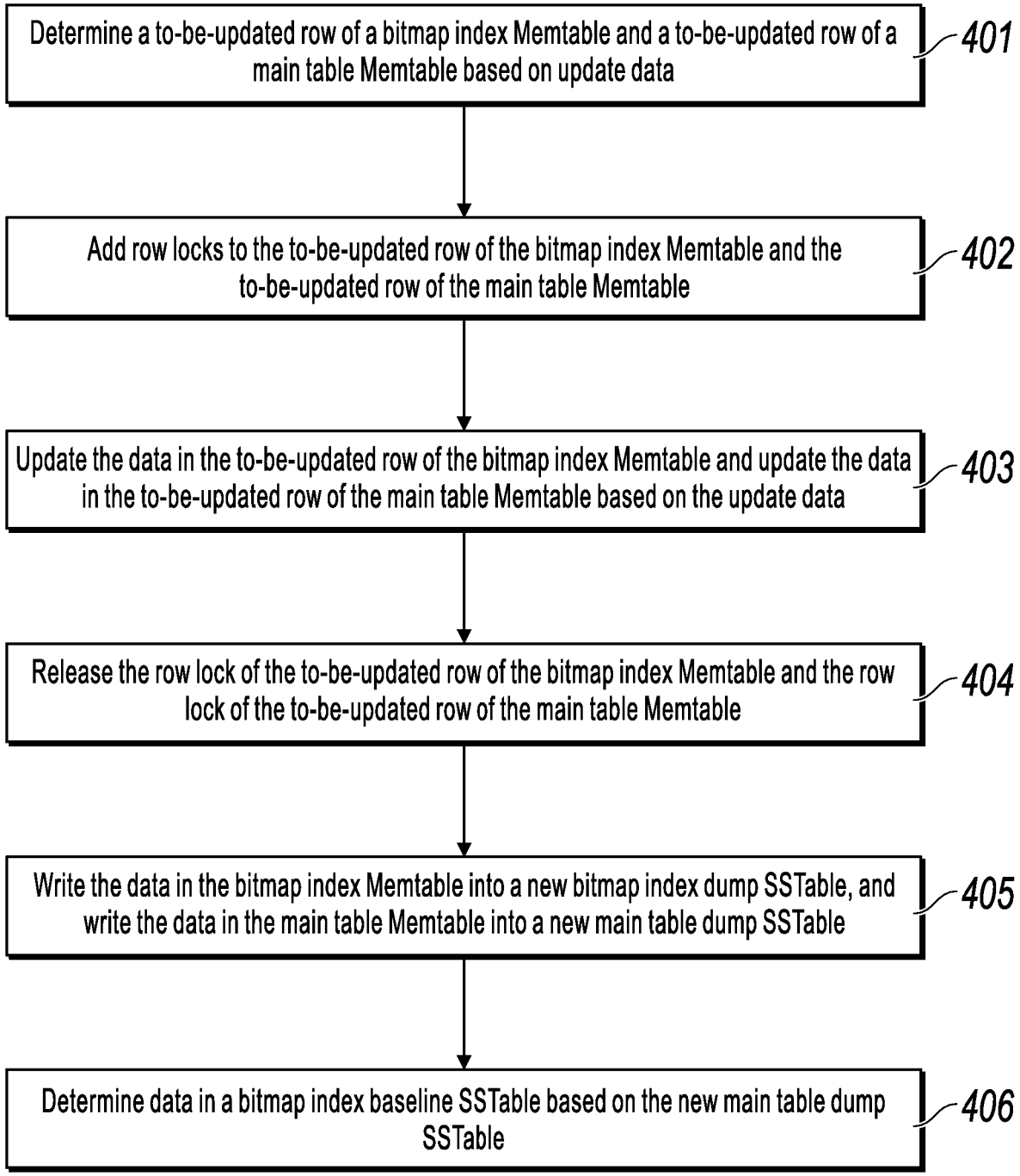
FIG. 4 is a flowchart illustrating a bitmap index merging method, according to an implementation of the present disclosure.

As shown in FIG. 4, an implementation of the present disclosure provides a bitmap index merging method, including the following:

Step 401: Determine a to-be-updated row of a bitmap index Memtable and a to-be-updated row of a main table Memtable based on update data.

Step 402: Add row locks to the to-be-updated row of the bitmap index Memtable and the to-be-updated row of the main table Memtable.

Step 403: Update data in the to-be-updated row of the bitmap index Memtable and data in the to-be-updated row of the main table Memtable based on the update data.

Step 404: Release the row lock of the to-be-updated row of the bitmap index Memtable and the row lock of the to-be-updated row of the main table Memtable.

Step 405: Write the data in the bitmap index Memtable into a new bitmap index dump SSTable, and write the data in the main table Memtable into a new main table dump SSTable.

Step 401 to step 405 are the dumping of the main table and the dumping of the bitmap index. Details are omitted here for simplicity.

Step 406: Determine data in a bitmap index baseline SSTable based on the new main table dump SSTable.

Step 406 includes the following:

d1: Write the data in the new main table dump SSTable into a new main table baseline SSTable in a macroblock format of the new main table baseline SSTable.

d2: Generate a bitmap of the bitmap index baseline SSTable based on the new main table baseline SSTable.

To be specific, a bitmap corresponding to the column value of the index column of the new main table baseline SSTable is generated based on the column value of the index column of the new main table baseline SSTable.

The bitmap index baseline SSTable stores data in a bitmap format. Referring to FIG. 5 and FIG. 6, column b has three different column values: 1, 2, and 3. Each column value generates a corresponding bitmap, and an nth bit of each bitmap is 1, indicating that the value of column b in an nth row is the value represented by the bitmap. The bitmap of b=3 is used as an example. The values of the 6th and the 7th rows are 1, indicating that the values of column b in the 6th and the 7th rows of the main table are all 3.

d3: Write the bitmap of the bitmap index baseline SSTable into the bitmap index baseline SSTable in a macroblock format of the bitmap index baseline SSTable.

d1 includes the following:

d11: Merge rows of an old main table baseline SSTable and the new main table dump SSTable based on an index column and a main table primary key column.

d12: Write the merged data into the new main table baseline SSTable in the macroblock format of the new main table baseline SSTable.

The bitmap index baseline SSTable includes one or more macroblocks, and each macroblock includes some or all of data in the bitmap index field. Data is no longer updated once written.

The new main table baseline SSTable includes one or more macroblocks, and each macroblock includes some or all of data in the main table field. Data is no longer updated once written.

Figure 7:
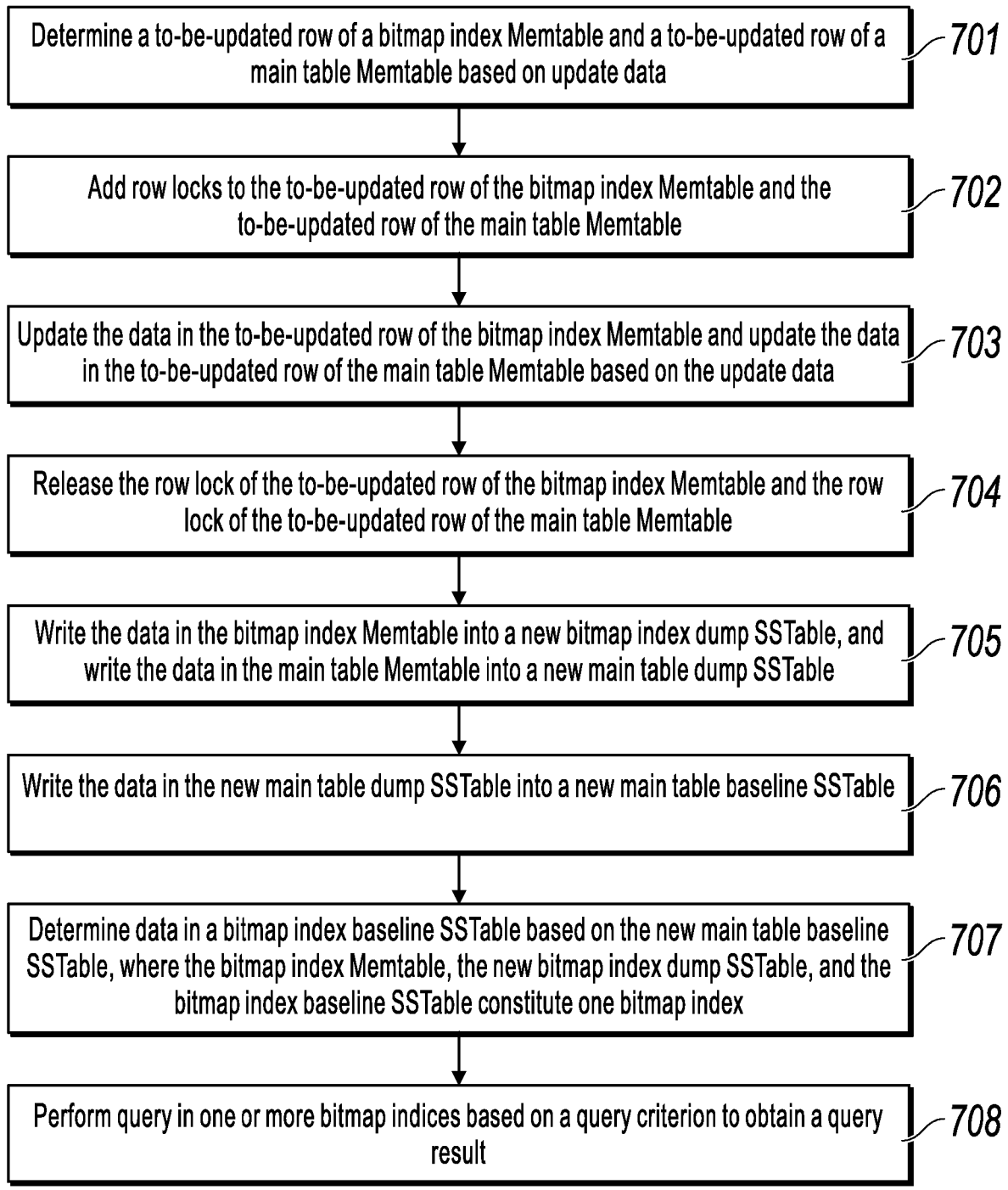
FIG. 7 is a flowchart illustrating a bitmap index querying method, according to an implementation of the present disclosure.

As shown in FIG. 7, an implementation of the present disclosure provides a bitmap index querying method, including the following:

Step 701: Determine a to-be-updated row of a bitmap index Memtable and a to-be-updated row of a main table Memtable based on update data.

Step 702: Add row locks to the to-be-updated row of the bitmap index Memtable and the to-be-updated row of the main table Memtable.

Step 703: Update data in the to-be-updated row of the bitmap index Memtable and data in the to-be-updated row of the main table Memtable based on the update data.

Step 704: Release the row lock of the to-be-updated row of the bitmap index Memtable and the row lock of the to-be-updated row of the main table Memtable.

Step 705: Write the data in the bitmap index Memtable into a new bitmap index dump SSTable, and write the data in the main table Memtable into a new main table dump SSTable.

Step 706: Write the data in the new main table dump SSTable into a new main table baseline SSTable.

Step 707: Determine data in a bitmap index baseline SSTable based on the new main table baseline SSTable, where the bitmap index Memtable, the new bitmap index dump SSTable, and the bitmap index baseline SSTable constitute one bitmap index.

Referring to FIG. 6, the bitmap index includes the bitmap index Memtable, the new bitmap index dump SSTable, and the bitmap index baseline SSTable. The main table includes the main table Memtable, the new main table dump SSTable, and the new main table baseline SSTable. Multiple bitmap indices can be created by using one main table, and the bitmap indices correspond to different index columns respectively.

Step 708: Perform query in one or more bitmap indices based on a query criterion to obtain a query result.

The query result may include data in any one or more of the main table Memtable, the new main table dump SSTable, and the new main table baseline SSTable. Therefore, in an actual application scenario, query needs to be performed separately in the corresponding bitmap index Memtable, the new bitmap index dump SSTable, and the bitmap index baseline SSTable.

The query process can be divided into two cases: single-column query and multi-column query. Each case corresponds to two application scenarios. In one application scenario, there is incremental data. The data in the bitmap index Memtable and the new bitmap index dump SSTable is incremental data. When there is incremental data, query needs to be performed in the bitmap index Memtable and/or the new bitmap index dump SSTable. In another application scenario, there is no incremental data. In such case, query does not need to be performed in the bitmap index Memtable or the new bitmap index dump SSTable.

In the implementation of the present disclosure, to speed up the query, the method further includes the following: dividing a column value of a primary key column of the new main table baseline SSTable to obtain at least two divided primary key ranges.

Because different divided primary key ranges may correspond to different application scenarios, by dividing the primary key range into different divided primary key ranges, the query of different divided primary key ranges can be distinguished. For the divided primary key ranges without incremental data, query does not need to be performed in the bitmap index Memtable and the new bitmap index dump SSTable, thereby speeding up the query. In an actual application scenario, the column value of the primary key column of the new main table baseline SSTable can be divided based on the macroblock range of the main table baseline SSTable. For example, if the range of the column value of the primary key column of macroblock 1 is 1-7 and the range of the column value of the primary key column of macroblock 2 is 8-14, the divided primary key range 1 is 1-7 and the divided primary key range 2 is 8-14.

For example, the range of the column value of the primary key column is 1-10, divided primary key range 1 is (smaller than 1), divided primary key range 2 is (1-5), divided primary key range 3 is (6-10), and divided primary key range 4 is (greater than 10). The divided primary key range 1 and the divided primary key range 4 are used to prevent the data in the bitmap index Memtable or in the new bitmap index dump SSTable from being omitted in the query process.

The following describes the previous two cases in detail based on the divided primary key ranges that are obtained through dividing.

Case 1: single-column query.

The performing query in one of the bitmap indices based on a query criterion to obtain a query result includes the following:

e1: When neither the bitmap index Memtable nor the new bitmap index dump SSTable includes data in the current divided primary key range, perform query in a current divided primary key range of the bitmap index baseline SSTable based on the query criterion to obtain a first baseline SSTable result bitmap of the current divided primary key range.

The performing query in a current divided primary key range of the bitmap index baseline SSTable based on the query criterion to obtain a first baseline SSTable result bitmap of the current divided primary key range includes the following:

e11: Determine, within the current divided primary key range of the bitmap index baseline SSTable, a bitmap corresponding to a column value of an index column that satisfies the query criterion.

e12: Perform a bitwise OR operation on the bitmap corresponding to the column value of the index column that satisfies the query criterion, to obtain the first baseline SSTable result bitmap.

Because the query processes of different divided primary key ranges are the same, query of only one divided primary key range is used as an example in the following implementations.

Referring to FIG. 6, assuming that the query criterion is $b \leq 2$, the column values of the index column satisfying the query criterion are 1 and 2. The bitmap corresponding to the column value 1 is 11001001, and the bitmap corresponding to the column value 2 is 00110000.

A bitwise OR operation is performed on the bitmap corresponding to the column value 1 and the bitmap corresponding to the column value 2 to obtain a first baseline SSTable result bitmap 11111001.

e2: Query the new main table baseline SSTable, based on the first baseline SSTable result bitmap, to obtain set of row results in a first baseline SSTable of the current divided primary key range, where the set of row results in the first baseline SSTable is a set of first final row results of the current divided primary key range.

The row marked as 1 in the baseline SSTable result bitmap is queried in the new main table baseline SSTable to obtain a set of row results in the first baseline SSTable.

e3: When either the bitmap index Memtable or the new bitmap index dump SSTable includes data in the current divided primary key range, perform query in a current divided primary key range of the bitmap index baseline SSTable based on the query criterion to obtain a first baseline SSTable result bitmap of the current divided primary key range.

e4: Perform query in a current divided primary key range of the new bitmap index dump SSTable based on the query criterion to obtain a set of row results in a first dump SSTable of the current divided primary key range.

e5: Perform query in a current divided primary key range of the bitmap index Memtable based on the query criterion to obtain a set of row results in a first Memtable of the current divided primary key range.

e6: Query the new main table baseline SSTable based on the first baseline SSTable result bitmap to obtain the set of row results in the first baseline SSTable of the current divided primary key range.

e7: Determine a union set of the set of row results in the first baseline SSTable, the set of row results in first dump SSTable, and the set of row results in the first Memtable, to obtain the set of first final row results of the current divided primary key range.

Because the set of row results in the first baseline SSTable, the set of row results in the first dump SSTable, and the set of row results in the first Memtable are sorted based on the main table primary key column, the set of the first final row results can be obtained by iterating and merging the rows of each set in sequence.

e8: Determine that the query result is a union set of the sets of the first final row results of the divided primary key ranges.

Here, e1-e2 correspond to the application scenario in which there is no incremental data in the divided primary key range; e3-e7 correspond to the application scenario in which there is incremental data in the divided primary key range; e8 means that the results of various divided primary key ranges are merged to obtain the final query result.

e3 is similar to e1, and details are omitted here for simplicity.

e4 includes the following:

e41: Determine a set of row results that satisfies the query criterion in the current divided primary key range of the new bitmap index dump SSTable.

Binary search is performed in the new bitmap index dump SSTable based on the index column, to obtain the set of rows that satisfies the query criterion. The rows in the set of row results that satisfies the query criterion are processed separately based on different row indices. Here, e42 represents the processing of the row marked as deletion and e43 represents the processing of the row marked as insertion.

e42: If a current row in the set of row results that satisfies the query criterion is marked as deletion, query whether the current row exists in the new main table baseline SSTable; if yes, delete a bit corresponding to the current row in the baseline SSTable result bitmap of the current divided primary key range; otherwise, delete the current row from the set of row results.

If the current row does not exist in the new main table baseline SSTable, it indicates that the row is deleted after being inserted during dumping. In such case, the current row is deleted from the set of row results.

e43: If a current row in the set of row results that satisfies the query criterion is marked as insertion, query whether the current row exists in the new main table baseline SSTable; if yes, delete the current row from the set of row results; otherwise, do not perform any processing.

If the current row does not exist in the new main table baseline SSTable, no processing is performed.

e44: The updated set of row results that satisfies the query criterion is the set of row results in the first dump SSTable.

When e42 or e43 is completed for all rows in the set of row results that satisfies the query criterion, the remaining rows in the set of row results form the set of row results in the first dump SSTable.

e5 includes the following:

e51: Determine a set of row results that satisfies the query criterion in the current divided primary key range of the bitmap index Memtable.

Query is performed in the bitmap index Memtable (for example, the B+ tree) based on the index column to obtain the set of row results that satisfies the criterion. Like e2, each row is processed based on the row indices in the set of row results.

e52: If a current row in the set of row results that satisfies the query criterion is marked as deletion, query whether the current row exists in the new main table baseline SSTable; if yes, delete a bit corresponding to the current row in the baseline SSTable result bitmap; otherwise, delete the current row from the set of row results.

If the current row does not exist in the new main table baseline SSTable, it indicates that the row is deleted after being inserted during dumping. In such case, the current row is deleted from the set of row results.

e53: If a current row in the set of row results that satisfies the query criterion is marked as insertion, query whether the current row exists in the new main table baseline SSTable; if yes, delete the current row from the set of row results.

If the current row does not exist in the new main table baseline SSTable, no processing is performed.

e54: The updated set of row results that satisfies the query criterion is the set of row results in the first Memtable.

When e52 or e53 is completed for all rows in the set of row results that satisfies the query criterion, the remaining rows in the set of row results form the set of row results in the Memtable.

The previously described single-column query is also applicable to the following case of multi-column query.

Case 2: multi-column query.

Based on different query criteria, case 2 can be further divided into obtaining a union set of multiple columns and obtaining an intersection of multiple columns. For example, when querying two columns, the query criterion for obtaining a union set of two columns can be a≥3 or b>5. The query criterion for obtaining an intersection of two columns can be a≥3 and b>5.

Similar to single-column query, multi-column query can also be performed based on the divided primary key ranges that are obtained through dividing. In such case, the method further includes the following: dividing a column value of a primary key column of the new main table baseline SSTable to obtain at least two divided primary key ranges.

(1) When the query criterion is an intersection of index columns of the bitmap indices, the performing query in multiple bitmap indices based on a query criterion to obtain a query result includes the following:

f1: When neither the bitmap index Memtable nor the new bitmap index dump SSTable for each of the bitmap indices includes data in the current divided primary key range, perform query in a current divided primary key range of the bitmap index baseline SSTable for each of the bitmap indices based on the query criterion to obtain a first baseline SSTable result bitmap of the current divided primary key range for each of the bitmap indices.

f2: Perform a bitwise AND operation on the first baseline SSTable result bitmap of the current divided primary key range for each of the bitmap indices, to obtain a second baseline SSTable result bitmap of the current divided primary key range.

f3: Query the new main table baseline SSTable based on the second baseline SSTable result bitmap to obtain a set of row results in a second baseline SSTable of the current divided primary key range, where the set of row results in the second baseline SSTable is a set of second final row results of the current divided primary key range.

f4: When the bitmap index Memtable and the new bitmap index dump SSTable for any of the bitmap indices include data in the current divided primary key range, determine a set of first final row results of the current divided primary key range for each of the bitmap indices based on the query criterion.

f5: Determine that the set of second final row results of the current divided primary key range is an intersection of the sets of first final row results of the current divided primary key ranges of the bitmap indices.

f6: Determine that the query result is a union set of the sets of second final row results of the divided primary key ranges.

Here, f1-f3 correspond to the application scenario in which there is no incremental data in the divided primary key range; f4 and f5 correspond to the application scenario in which there is incremental data in the divided primary key range; f6 means that the results of various divided primary key ranges are merged to obtain the final query result.

(2) Obtaining a union set

The method further includes the following: dividing a column value of a primary key column of the new main table baseline SSTable to obtain at least two divided primary key ranges.

When the query criterion is a union set of index columns of the bitmap indices, the performing query in multiple bitmap indices based on a query criterion to obtain a query result includes the following:

g1: When neither the bitmap index Memtable nor the new bitmap index dump SSTable for each of the bitmap indices includes data in the current divided primary key range, perform query in a current divided primary key range of the bitmap index baseline SSTable for each of the bitmap indices based on the query criterion to obtain a first baseline SSTable result bitmap of the current divided primary key range for each of the bitmap indices.

g2: Perform a bitwise OR operation on the first baseline SSTable result bitmap of the current divided primary key range for each of the bitmap indices, to obtain a third baseline SSTable result bitmap of the current divided primary key range.

g3: Query the new main table baseline SSTable based on the third baseline SSTable result bitmap to obtain a set of row results in a third baseline SSTable of the current divided primary key range, where the set of row results in the third baseline SSTable is a set of third final row results of the current divided primary key range.

g4: When the bitmap index Memtable and the new bitmap index dump SSTable for any of the bitmap indices include data in the current divided primary key range, determine the first baseline SSTable result bitmap of the current divided primary key range for each of the bitmap indices, the set of row results in the first dump SSTable of the current divided primary key range for each of the bitmap indices, and the set of row results in the first Memtable of the current divided primary key range for each of the bitmap indices based on the query criterion.

g5: Perform a bitwise OR operation on the baseline SSTable result bitmap of the current divided primary key range for each of the bitmap indices, to obtain a third baseline SSTable result bitmap of the current divided primary key range.

g6: Determine a union set of the set of row results in the first dump SSTable of the current divided primary key range of the current bitmap index and the set of row results in the first Memtable of the current divided primary key range of the current bitmap index, to obtain a set of incremental data row results of the current divided primary key range of the current bitmap index.

g6 is performed by using each of the bitmap indices as the current bitmap index.

g7: Determine a union set of sets of incremental data row results of the current divided primary key ranges of the bitmap indices, to obtain a set of incremental data row results of the current divided primary key range.

g8: Query the new main table baseline SSTable based on the third baseline SSTable result bitmap to obtain the set of row results in the third baseline SSTable of the current divided primary key range.

g9: Determine a union set of the sets of incremental data row results of the current divided primary key range and the set of row results in the third baseline SSTable of the current divided primary key range, to obtain a set of third final row results of the current divided primary key range.

g10: Determine that the query result is a union set of the sets of third final row results of the divided primary key ranges.

Here, g1-g3 correspond to the application scenario in which there is no incremental data in the divided primary key range; g4-g9 correspond to the application scenario in which there is incremental data in the divided primary key range; g10 means that the results of various divided primary key ranges are merged to obtain the final query result.

In the process of multi-column query or in the process of obtaining an intersection or a union set of multiple columns, for the divided primary key ranges without incremental data, a bitwise OR operation or a bitwise AND operation can be performed directly on bitmaps. As such, the query speed is higher in comparison with obtaining a union set or an intersection by using the set of row results.

It is worthwhile to note that, in practice, application scenarios may not be distinguished, and the baseline SSTable, the dump SSTable, and the Memtable of the bitmap indices can be queried in sequence in the query process. For example, in the process of multi-column query, when the query criterion is a union set of index columns of the bitmap indices, a set of first final row results of the current divided primary key range for each of the bitmap indices can be further determined. A union set of the sets of first final row results of the current divided primary key ranges of the bitmap indices is the query result of the current divided primary key range. A union set of the query results of various divided primary key ranges is the query result of multi-column query.

Figure 8:
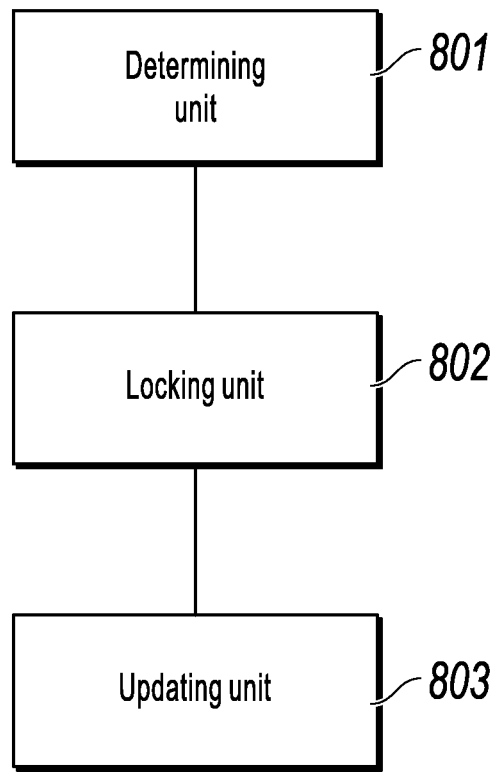
FIG. 8 is a schematic structural diagram illustrating a bitmap index writing apparatus, according to an implementation of the present disclosure.

As shown in FIG. 8, a bitmap index writing apparatus includes the following: a determining unit 801, configured to determine a to-be-updated row of a bitmap index Memtable based on update data; a locking unit 802, configured to add a row lock to the to-be-updated row of the bitmap index Memtable; and an updating unit 803, configured to update data in the to-be-updated row of the bitmap index Memtable based on the update data.

In an implementation of the present disclosure, the updating unit 803 is configured to determine a column value of a main table primary key column and a column value of an index column of the update data; and write the column value of the main table primary key column and the column value of the index column of the update data into the to-be-updated row of the bitmap index Memtable.

Figure 9:
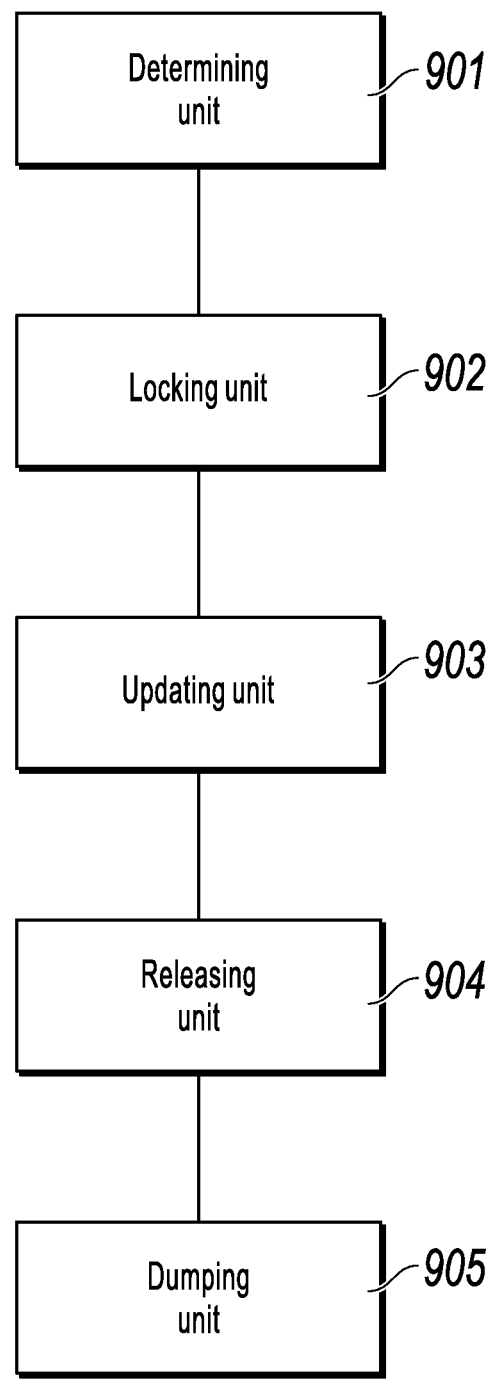
FIG. 9 is a schematic structural diagram illustrating a bitmap index dumping apparatus, according to an implementation of the present disclosure.

As shown in FIG. 9, an implementation of the present disclosure provides a bitmap index dumping apparatus, including the following: a determining unit 901, configured to determine a to-be-updated row of a bitmap index Memtable based on update data; a locking unit 902, configured to add a row lock to the to-be-updated row of the bitmap index Memtable; an updating unit 903, configured to update data in the to-be-updated row of the bitmap index Memtable based on the update data; a releasing unit 904, configured to release the row lock of the to-be-updated row of the bitmap index Memtable; and a dumping unit 905, configured to write the data in the bitmap index Memtable into a new bitmap index dump SSTable.

In an implementation of the present disclosure, the dumping unit 905 is configured to freeze the bitmap index Memtable; and write the data in the frozen bitmap index Memtable into the new bitmap index dump SSTable in a macroblock format of the new bitmap index dump SSTable.

In an implementation of the present disclosure, the dumping unit 905 is configured to merge rows of an old bitmap index dump SSTable and the frozen bitmap index Memtable based on an index column and a main table primary key column; and write the merged data into the new bitmap index dump SSTable in the macroblock format of the new bitmap index dump SSTable.

Figure 10:
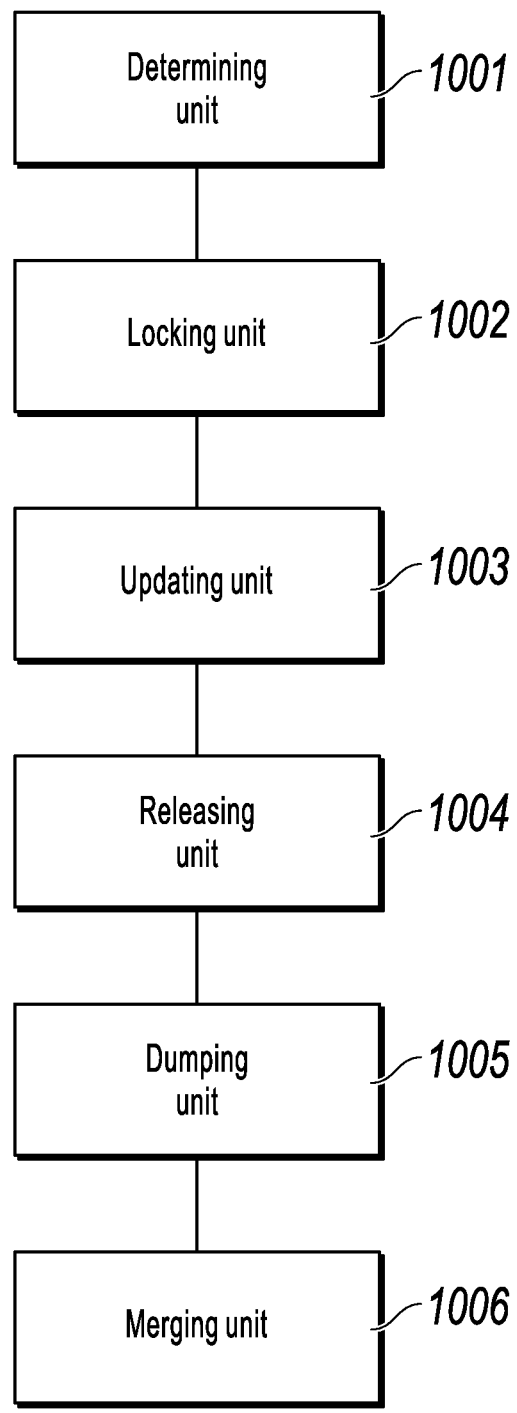
FIG. 10 is a schematic structural diagram illustrating a bitmap index merging apparatus, according to an implementation of the present disclosure.

As shown in FIG. 10, the present disclosure provides a bitmap index merging apparatus, including the following: a determining unit 1001, configured to determine a to-be-updated row of a bitmap index Memtable and a to-be-updated row of a main table Memtable based on update data; a locking unit 1002, configured to add row locks to the to-be-updated row of the bitmap index Memtable and the to-be-updated row of the main table Memtable; an updating unit 1003, configured to update data in the to-be-updated row of the bitmap index Memtable and data in the to-be-updated row of the main table Memtable based on the update data; a releasing unit 1004, configured to release the row lock of the to-be-updated row of the bitmap index Memtable and the row lock of the to-be-updated row of the main table Memtable; a dumping unit 1005, configured to write the data in the bitmap index Memtable into a new bitmap index dump SSTable, and write the data in the main table Memtable into a new main table dump SSTable; and a merging unit 1006, configured to determine data in a bitmap index baseline SSTable based on the new main table dump SSTable.

In an implementation of the present disclosure, the merging unit 1006 is configured to write the data in the new main table dump SSTable into a new main table baseline SSTable in a macroblock format of the new main table baseline SSTable; generate a bitmap of the bitmap index baseline SSTable based on the new main table baseline SSTable; and write the bitmap of the bitmap index baseline SSTable into the bitmap index baseline SSTable in a macroblock format of the bitmap index baseline SSTable.

In an implementation of the present disclosure, the merging unit 1006 is configured to merge rows of an old main table baseline SSTable and the new main table dump SSTable based on an index column and a main table primary key column; and write the merged data into the new main table baseline SSTable in the macroblock format of the new main table baseline SSTable.

Figure 11:
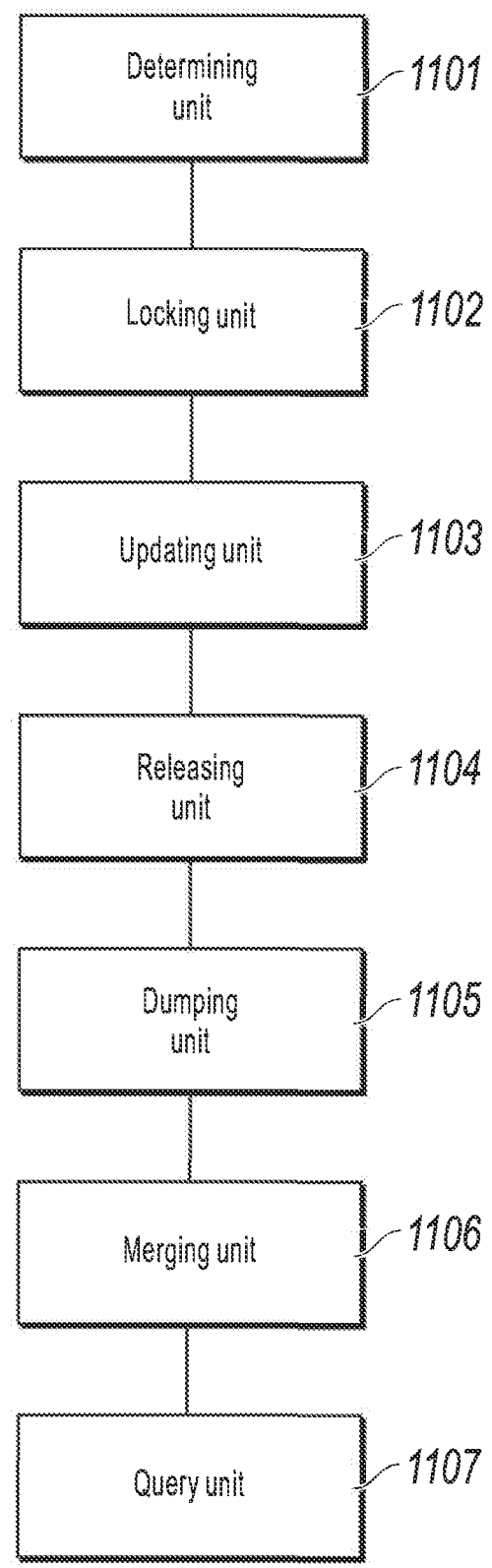
FIG. 11 is a schematic structural diagram illustrating a bitmap index querying apparatus, according to an implementation of the present disclosure.

As shown in FIG. 11, an implementation of the present disclosure provides a bitmap index querying apparatus, including the following: a determining unit 1101, configured to determine a to-be-updated row of a bitmap index Memtable and a to-be-updated row of a main table Memtable based on update data; a locking unit 1102, configured to add row locks to the to-be-updated row of the bitmap index Memtable and the to-be-updated row of the main table Memtable; an updating unit 1103, configured to update data in the to-be-updated row of the bitmap index Memtable and data in the to-be-updated row of the main table Memtable based on the update data; a releasing unit 1104, configured to release the row lock of the to-be-updated row of the bitmap index Memtable and the row lock of the to-be-updated row of the main table Memtable; a dumping unit 1105, configured to write the data in the bitmap index Memtable into a new bitmap index dump SSTable, and write the data in the main table Memtable into a new main table dump SSTable; a merging unit 1106, configured to write the data in the new main table dump SSTable into a new main table baseline SSTable; and determine data in a bitmap index baseline SSTable based on the new main table baseline SSTable, where the bitmap index Memtable, the new bitmap index dump SSTable, and the bitmap index baseline SSTable constitute one bitmap index; and a query unit 1107, configured to perform query in one or more bitmap indices based on a query criterion to obtain a query result.

In an implementation of the present disclosure, the apparatus further includes the following: a dividing unit, configured to divide a column value of a primary key column of the new main table baseline SSTable to obtain at least two divided primary key ranges; and the query unit 1107 is configured to: when neither the bitmap index Memtable nor the new bitmap index dump SSTable includes data in the current divided primary key range, perform query in a current divided primary key range of the bitmap index baseline SSTable based on the query criterion to obtain a first baseline SSTable result bitmap of the current divided primary key range; and query the new main table baseline SSTable based on the first baseline SSTable result bitmap to obtain a set of row results in a first baseline SSTable of the current divided primary key range, where the set of row results in the first baseline SSTable is a set of first final row results of the current divided primary key range; or when either the bitmap index Memtable or the new bitmap index dump SSTable includes data in the current divided primary key range, perform query in a current divided primary key range of the bitmap index baseline SSTable based on the query criterion to obtain a first baseline SSTable result bitmap of the current divided primary key range; perform query in a current divided primary key range of the new bitmap index dump SSTable based on the query criterion to obtain a set of row results in a first dump SSTable of the current divided primary key range; perform query in a current divided primary key range of the bitmap index Memtable based on the query criterion to obtain a set of row results in a first Memtable of the current divided primary key range; query the new main table baseline SSTable based on the first baseline SSTable result bitmap to obtain the set of row results in the first baseline SSTable of the current divided primary key range; determine a union set of the set of row results in the first baseline SSTable, the set of row results in the first dump SSTable, and the set of row results in the first Memtable, to obtain the set of first final row results of the current divided primary key range; and determine that the query result is a union set of the sets of first final row results of the divided primary key ranges.

In an implementation of the present disclosure, the query unit 1107 is configured to determine, within the current divided primary key range of the bitmap index baseline SSTable, a bitmap corresponding to a column value of an index column that satisfies the query criterion; and perform a bitwise OR operation on the bitmap corresponding to the column value of the index column that satisfies the query criterion, to obtain the first baseline SSTable result bitmap.

In an implementation of the present disclosure, the query unit 1107 is configured to determine a set of row results that satisfies the query criterion in the current divided primary key range of the new bitmap index dump SSTable; if a current row in the set of row results that satisfies the query criterion is marked as deletion, query whether the current row exists in the new main table baseline SSTable; if yes, delete a bit corresponding to the current row in the baseline SSTable result bitmap of the current divided primary key range; otherwise, delete the current row from the set of row results; or if a current row in the set of row results that satisfies the query criterion is marked as insertion, query whether the current row exists in the new main table baseline SSTable; if yes, delete the current row from the set of row results, where the updated set of row results that satisfies the query criterion is the set of row results in the first dump SSTable.

In an implementation of the present disclosure, the query unit 1107 is configured to determine a set of row results that satisfies the query criterion in the current divided primary key range of the bitmap index Memtable; if a current row in the set of row results that satisfies the query criterion is marked as deletion, query whether the current row exists in the new main table baseline SSTable; if yes, delete a bit corresponding to the current row in the baseline SSTable result bitmap; otherwise, delete the current row from the set of row results; or if a current row in the set of row results that satisfies the query criterion is marked as insertion, query whether the current row exists in the new main table baseline SSTable; if yes, delete the current row from the set of row results, where the updated set of row results that satisfies the query criterion is the set of row results in the first Memtable.

In an implementation of the present disclosure, the apparatus further includes the following: a dividing unit, configured to divide a column value of a primary key column of the new main table baseline SSTable to obtain at least two divided primary key ranges; and the query unit 1107 is configured to: when the query criterion is an intersection of index columns of the bitmap indices, and when neither the bitmap index Memtable nor the new bitmap index dump SSTable for each of the bitmap indices includes data in the current divided primary key range, perform query in a current divided primary key range of the bitmap index baseline SSTable for each of the bitmap indices based on the query criterion to obtain a first baseline SSTable result bitmap of the current divided primary key range for each of the bitmap indices; perform a bitwise AND operation on the first baseline SSTable result bitmap of the current divided primary key range for each of the bitmap indices, to obtain a second baseline SSTable result bitmap of the current divided primary key range; query the new main table baseline SSTable based on the second baseline SSTable result bitmap to obtain a set of row results in a second baseline SSTable of the current divided primary key range, where the set of row results in the second baseline SSTable is a set of second final row results of the current divided primary key range; or when the bitmap index Memtable and the new bitmap index dump SSTable for any of the bitmap indices include data in the current divided primary key range, determine a set of first final row results of the current divided primary key range for each of the bitmap indices based on the query criterion; determine that the set of second final row results of the current divided primary key range is an intersection of the sets of first final row results of the current divided primary key ranges of the bitmap indices; and determine that the query result is a union set of the sets of second final row results of the divided primary key ranges.

In an implementation of the present disclosure, the apparatus further includes the following: a dividing unit, configured to divide a column value of a primary key column of the new main table baseline SSTable to obtain at least two divided primary key ranges; and the query unit 1107 is configured to: when the query criterion is a union set of index columns of the bitmap indices, and when neither the bitmap index Memtable nor the new bitmap index dump SSTable for each of the bitmap indices includes data in the current divided primary key range, perform query in a current divided primary key range of the bitmap index baseline SSTable for each of the bitmap indices based on the query criterion to obtain a first baseline SSTable result bitmap of the current divided primary key range for each of the bitmap indices; perform a bitwise OR operation on the first baseline SSTable result bitmap of the current divided primary key range for each of the bitmap indices, to obtain a third baseline SSTable result bitmap of the current divided primary key range; query the new main table baseline SSTable based on the third baseline SSTable result bitmap to obtain the set of row results in the third baseline SSTable of the current divided primary key range, where the set of row results in the third baseline SSTable is a set of third final row results of the current divided primary key range; or when the bitmap index Memtable and the new bitmap index dump SSTable for any of the bitmap indices include data in the current divided primary key range, determine the first baseline SSTable result bitmap of the current divided primary key range for each of the bitmap indices, the set of row results in the first dump SSTable of the current divided primary key range for each of the bitmap indices, and the set of row results in the first Memtable of the current divided primary key range for each of the bitmap indices based on the query criterion; perform a bitwise OR operation on the baseline SSTable result bitmap of the current divided primary key range for each of the bitmap indices, to obtain a third baseline SSTable result bitmap of the current divided primary key range; determine a union set of the set of row results in the first dump SSTable of the current divided primary key range of the current bitmap index and the set of row results in the first Memtable of the current divided primary key range of the current bitmap index, to obtain a set of incremental data row results of the current divided primary key range of the current bitmap index; determine a union set of sets of incremental data row results of the current divided primary key ranges of the bitmap indices, to obtain a set of incremental data row results of the current divided primary key range; query the new main table baseline SSTable based on the third baseline SSTable result bitmap to obtain the set of row results in the third baseline SSTable of the current divided primary key range; determine a union set of the sets of incremental data row results of the current divided primary key range and the set of row results in the third baseline SSTable of the current divided primary key range, to obtain a set of third final row results of the current divided primary key range; and determine that the query result is a union set of the sets of third final row results of the divided primary key ranges.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors:

ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The systems, apparatuses, modules, or units illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smart phone, a personal digital assistant, a media player, a navigation device, an e-mail device, a game console, a tablet computer, a wearable device, or a combination of any of these devices.

For ease of description, the previous apparatus is described by dividing functions into various units. Certainly, when the present application is implemented, a function of each unit can be implemented in one or more pieces of software and/or hardware.

A person skilled in the art should understand that the implementations of the present disclosure can be provided as methods, systems, or computer program products. Therefore, the present disclosure can use a form of hardware only implementations, software only implementations, or implementations with a combination of software and hardware. Moreover, the present disclosure can use a form of a computer program product that is implemented on one or more computer-usable storage media (including but not limited to a magnetic disk memory, a CD-ROM, and an optical memory) that include computer-usable program code.

The present disclosure is described with reference to the flowcharts and/or block diagrams of the methods, the devices (systems), and the computer program products according to the implementations of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded and installed onto the computer or another programmable data processing device, so a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), one or more input/output interfaces, one or more network interfaces, and one or more memories.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. Based on the definition in the present specification, the computer readable medium does not include transitory media such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

The present application can be described in the general context of executable computer instructions executed by a computer, for example, a program module. Generally, the program module includes a routine, a program, an object, a component, a data structure, etc. executing a specific task or implementing a specific abstract data type. The present application can alternatively be practiced in distributed computing environments in which tasks are performed by remote processing devices that are connected through a communications network. In a distributed computing environment, the program module can be located in both local and remote computer storage media including storage devices.

The implementations in the present specification are described in a progressive way. For same or similar parts of the implementations, references can be made to the implementations mutually. Each implementation focuses on a difference from other implementations. Particularly, a system implementation is similar to a method implementation, and therefore is described briefly. For related parts, references can be made to related descriptions in the method implementation.

The previous descriptions are merely implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

What is claimed is:

1. A computer-implemented method, comprising:
    determining a to-be-updated row of a bitmap index data structure and a to-be-updated row of a main table data structure based on update data;
    adding row locks to the to-be-updated row of the bitmap index data structure and the to-be-updated row of the main table data structure;
    updating first data in the to-be-updated row of the bitmap index data structure and updating second data in the to-be-updated row of the main table data structure based on the update data;
    releasing the row lock of the to-be-updated row of the bitmap index data structure and the row lock of the to-be-updated row of the main table data structure;
    writing the first data into a new bitmap index dump data structure;
    writing the second data into a new main table dump data structure;
    writing the second data in the new main table dump data structure into a new main table baseline data structure;
    determining data in a bitmap index baseline data structure based on the new main table baseline data structure, wherein the bitmap index data structure, the new bitmap index dump data structure, and the bitmap index baseline data structure form a bitmap index; and
    obtaining a query result by performing a query in one or more bitmap indices based on a query criterion.

2. The computer-implemented method of claim 1, wherein:
    the bitmap index data structure comprises a bitmap index Memtable;
    the main table data structure comprises a main table Memtable;
    the new bitmap index dump data structure comprises a new bitmap index dump SSTable;
    the new main table dump data structure comprises a new main table dump SSTable;
    the new main table baseline data structure comprises a new main table baseline SSTable; and
    the bitmap index baseline data structure comprises a bitmap index baseline SSTable.

3. The computer-implemented method of claim 1, wherein performing the query comprises performing the query in the main table data structure, the new main table dump data structure, and the new main table baseline data structure.

4. The computer-implemented method of claim 1, further comprising dividing a column value of a primary key column of the new main table baseline data structure to obtain at least two divided primary key ranges, wherein performing the query in one or more bitmap indices based on the query criterion comprises:
    when neither the bitmap index data structure nor the new bitmap index dump data structure comprises data in a current divided primary key range,
        performing the query in the current divided primary key range of the bitmap index baseline data structure based on the query criterion to obtain a first baseline SSTable result bitmap of the current divided primary key range; and
        querying the new main table baseline data structure based on the first baseline SSTable result bitmap to obtain a set of row results in a first baseline SSTable of the current divided primary key range, wherein the set of row results in the first baseline SSTable is a set of first final row results of the current divided primary key range;
    when either the bitmap index data structure or the new bitmap index dump data structure comprises data in the current divided primary key range,
        performing the query in the current divided primary key range of the bitmap index baseline data structure based on the query criterion to obtain the first baseline SSTable result bitmap of the current divided primary key range;
        performing the query in the current divided primary key range of the new bitmap index dump data structure based on the query criterion to obtain a set of row results in a first dump SSTable of the current divided primary key range;
        performing the query in the current divided primary key range of the bitmap index data structure based on the query criterion to obtain a set of row results in a first Memtable of the current divided primary key range;
        querying the new main table baseline data structure based on the first baseline SSTable result bitmap to obtain the set of row results in the first baseline SSTable of the current divided primary key range;
        determining a union set of the set of row results in the first baseline SSTable, the set of row results in the first dump SSTable, and the set of row results in the first Memtable, to obtain a set of first final row results of the current divided primary key range; and
        determining that the query result is a union set of the sets of first final row results of the at least two divided primary key ranges.

5. The computer-implemented method of claim 4, wherein:
    performing the query in the current divided primary key range of the bitmap index baseline data structure based on the query criterion to obtain the first baseline SSTable result bitmap of the current divided primary key range comprises:
        determining, within the current divided primary key range of the bitmap index baseline data structure, a bitmap corresponding to a column value of an index column that satisfies the query criterion; and
        performing a bitwise OR operation on the bitmap corresponding to the column value of the index column that satisfies the query criterion, to obtain the first baseline SSTable result bitmap.

6. The computer-implemented method of claim 4, wherein:
    performing the query in the current divided primary key range of the new bitmap index dump data structure based on the query criterion to obtain the set of row results in the first dump SSTable of the current divided primary key range comprises:
  determining a first set of row results that satisfies the query criterion in the current divided primary key range of the new bitmap index dump data structure;
  when a current row in the first set of row results that satisfies the query criterion is marked as deletion:
    querying whether the current row exists in the new main table baseline data structure;
    when the current row exists in the new main table baseline data structure, deleting a bit corresponding to the current row in the first baseline SSTable result bitmap of the current divided primary key range; and
    when the current row does not exist in the new main table baseline data structure, deleting the current row from the first set of row results;
  when the current row in the first set of row results that satisfies the query criterion is marked as insertion:
    querying whether the current row exists in the new main table baseline data structure; and
    when the current row exists in the new main table baseline data structure, deleting the current row from the first set of row results; and
  an updated set of row results that satisfies the query criterion is the set of row results in the first dump SSTable.

7. The computer-implemented method of claim 4, wherein:
  performing the query in the current divided primary key range of the bitmap index data structure based on the query criterion to obtain the set of row results in the first Memtable of the current divided primary key range comprises:
    determining a first set of row results that satisfies the query criterion in the current divided primary key range of the bitmap index data structure;
    when a current row in the first set of row results that satisfies the query criterion is marked as deletion:
      querying whether the current row exists in the new main table baseline data structure;
      when the current row exists in the new main table baseline data structure, deleting a bit corresponding to the current row in the first baseline SSTable result bitmap; and
      when the current row does not exists in the new main table baseline data structure, deleting the current row from the first set of row results;
    when the current row in the first set of row results that satisfies the query criterion is marked as insertion:
      querying whether the current row exists in the new main table baseline data structure; and
      deleting the current row from the first set of row results; and
  an updated set of row results that satisfies the query criterion is the set of row results in the first Memtable.

8. The computer-implemented method of claim 1, further comprising:
  dividing a column value of a primary key column of the new main table baseline data structure to obtain at least two divided primary key ranges, wherein the one or more bitmap indices comprises multiple bitmap indices; and
  when the query criterion is an intersection of index columns of the multiple bitmap indices, performing the query in the one or more bitmap indices based on the query criterion comprises:
    when neither the bitmap index data structure nor the new bitmap index dump data structure for each of the multiple bitmap indices comprises data in a current divided primary key range,
      performing the query in the current divided primary key range of the bitmap index baseline data structure for each of the multiple bitmap indices based on the query criterion to obtain a first baseline SSTable result bitmap of the current divided primary key range for each of the multiple bitmap indices;
      performing a bitwise AND operation on the first baseline SSTable result bitmap of the current divided primary key range for each of the multiple bitmap indices, to obtain a second baseline SSTable result bitmap of the current divided primary key range; and
      querying the new main table baseline data structure based on the second baseline SSTable result bitmap to obtain a set of row results in a second baseline SSTable of the current divided primary key range, wherein the set of row results in the second baseline SSTable is a set of second final row results of the current divided primary key range;
    when the bitmap index data structure and the new bitmap index dump data structure for any of the multiple bitmap indices comprise data in the current divided primary key range, determining a set of first final row results of the current divided primary key range for each of the multiple bitmap indices based on the query criterion;
    determining that the set of second final row results of the current divided primary key range is an intersection of the sets of first final row results of the current divided primary key ranges of the multiple bitmap indices; and
    determining that the query result is a union set of the sets of second final row results of the divided primary key ranges.

9. The computer-implemented method of claim 1, further comprising:
  dividing a column value of a primary key column of the new main table baseline data structure to obtain at least two divided primary key ranges wherein the one or more bitmap indices comprises multiple bitmap indices; and
  when the query criterion is a union set of index columns of the multiple bitmap indices, performing the query in the one or more bitmap indices based on the query criterion comprises:
    when neither the bitmap index data structure nor the new bitmap index dump data structure for each of the bitmap indices comprises data in a current divided primary key range, performing the query in a current divided primary key range of the bitmap index baseline data structure for each of the multiple bitmap indices based on the query criterion to obtain a first baseline SSTable result bitmap of the current divided primary key range for each of the multiple bitmap indices;
    performing a bitwise OR operation on the first baseline SSTable result bitmap of the current divided primary key range for each of the multiple bitmap indices, to obtain a third baseline SSTable result bitmap of the current divided primary key range;

querying the new main table baseline data structure based on the third baseline SSTable result bitmap to obtain a set of row results in a third baseline SSTable of the current divided primary key range, wherein the set of row results in the third baseline SSTable is a set of third final row results of the current divided primary key range;

when the bitmap index data structure and the new bitmap index dump data structure for any of the multiple bitmap indices comprise data in the current divided primary key range, determining the first baseline SSTable result bitmap of the current divided primary key range for each of the multiple bitmap indices, the set of row results in a first dump SSTable of the current divided primary key range for each of the bitmap indices, and the set of row results in a first Memtable of the current divided primary key range for each of the bitmap indices based on the query criterion;

performing a bitwise OR operation on the first baseline SSTable result bitmap of the current divided primary key range for each of the bitmap indices, to obtain a third baseline SSTable result bitmap of the current divided primary key range;

determining a union set of the set of row results in the first dump SSTable of the current divided primary key range of a current bitmap index and the set of row results in the first Memtable of the current divided primary key range of the current bitmap index, to obtain a set of incremental data row results of the current divided primary key range of the current bitmap index;

determining a union set of sets of incremental data row results of the current divided primary key ranges of the multiple bitmap indices, to obtain a set of incremental data row results of the current divided primary key range;

querying the new main table baseline data structure based on the third baseline SSTable result bitmap to obtain the set of row results in the third baseline SSTable of the current divided primary key range;

determining a union set of the sets of incremental data row results of the current divided primary key range and the set of row results in the third baseline SSTable of the current divided primary key range, to obtain a set of third final row results of the current divided primary key range; and determining that the query result is a union set of the sets of third final row results of the divided primary key ranges.

10. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
determining a to-be-updated row of a bitmap index data structure and a to-be-updated row of a main table data structure based on update data;
adding row locks to the to-be-updated row of the bitmap index data structure and the to-be-updated row of the main table data structure;

updating first data in the to-be-updated row of the bitmap index data structure and updating second data in the to-be-updated row of the main table data structure based on the update data;

releasing the row lock of the to-be-updated row of the bitmap index data structure and the row lock of the to-be-updated row of the main table data structure;

writing the first data into a new bitmap index dump data structure;

writing the second data into a new main table dump data structure;

writing the second data in the new main table dump data structure into a new main table baseline data structure;

determining data in a bitmap index baseline data structure based on the new main table baseline data structure, wherein the bitmap index data structure, the new bitmap index dump data structure, and the bitmap index baseline data structure form a bitmap index; and obtaining a query result by performing a query in one or more bitmap indices based on a query criterion.

11. The computer-implemented system of claim 10, wherein:
the bitmap index data structure comprises a bitmap index Memtable;
the main table data structure comprises a main table Memtable;
the new bitmap index dump data structure comprises a new bitmap index dump SSTable;
the new main table dump data structure comprises a new main table dump SSTable;
the new main table baseline data structure comprises a new main table baseline SSTable; and
the bitmap index baseline data structure comprises a bitmap index baseline SSTable.

12. The computer-implemented system of claim 10, wherein performing the query comprises performing the query in the main table data structure, the new main table dump data structure, and the new main table baseline data structure.

13. The computer-implemented system of claim 10, wherein the operations comprise dividing a column value of a primary key column of the new main table baseline data structure to obtain at least two divided primary key ranges, wherein performing the query in one or more bitmap indices based on the query criterion comprises:
when neither the bitmap index data structure nor the new bitmap index dump data structure comprises data in a current divided primary key range,
performing the query in the current divided primary key range of the bitmap index baseline data structure based on the query criterion to obtain a first baseline SSTable result bitmap of the current divided primary key range; and
querying the new main table baseline data structure based on the first baseline SSTable result bitmap to obtain a set of row results in a first baseline SSTable of the current divided primary key range, wherein the set of row results in the first baseline SSTable is a set of first final row results of the current divided primary key range;
when either the bitmap index data structure or the new bitmap index dump data structure comprises data in the current divided primary key range,
performing the query in the current divided primary key range of the bitmap index baseline data structure based on the query criterion to obtain the first baseline SSTable result bitmap of the current divided primary key range;
performing the query in the current divided primary key range of the new bitmap index dump data structure based on the query criterion to obtain a set of row results in a first dump SSTable of the current divided primary key range;
performing the query in the current divided primary key range of the bitmap index data structure based on the query criterion to obtain a set of row results in a first Memtable of the current divided primary key range;
querying the new main table baseline data structure based on the first baseline SSTable result bitmap to obtain the set of row results in the first baseline SSTable of the current divided primary key range;
determining a union set of the set of row results in the first baseline SSTable, the set of row results in the first dump SSTable, and the set of row results in the first Memtable, to obtain a set of first final row results of the current divided primary key range; and
determining that the query result is a union set of the sets of first final row results of the at least two divided primary key ranges.

14. The computer-implemented system of claim 13, wherein:
performing the query in the current divided primary key range of the bitmap index baseline data structure based on the query criterion to obtain the first baseline SSTable result bitmap of the current divided primary key range comprises:
determining, within the current divided primary key range of the bitmap index baseline data structure, a bitmap corresponding to a column value of an index column that satisfies the query criterion; and
performing a bitwise OR operation on the bitmap corresponding to the column value of the index column that satisfies the query criterion, to obtain the first baseline SSTable result bitmap.

15. The computer-implemented system of claim 13, wherein:
performing the query in the current divided primary key range of the new bitmap index dump data structure based on the query criterion to obtain the set of row results in the first dump SSTable of the current divided primary key range comprises:
determining a first set of row results that satisfies the query criterion in the current divided primary key range of the new bitmap index dump data structure;
when a current row in the first set of row results that satisfies the query criterion is marked as deletion:
querying whether the current row exists in the new main table baseline data structure;
when the current row exists in the new main table baseline data structure, deleting a bit corresponding to the current row in the first baseline SSTable result bitmap of the current divided primary key range; and
when the current row does not exist in the new main table baseline data structure, deleting the current row from the first set of row results;
when the current row in the first set of row results that satisfies the query criterion is marked as insertion:
querying whether the current row exists in the new main table baseline data structure; and when the current row exists in the new main table baseline data structure, deleting the current row from the first set of row results; and
an updated set of row results that satisfies the query criterion is the set of row results in the first dump SSTable.

16. The computer-implemented system of claim 13, wherein:
performing the query in the current divided primary key range of the bitmap index data structure based on the query criterion to obtain the set of row results in the first Memtable of the current divided primary key range comprises:
determining a first set of row results that satisfies the query criterion in the current divided primary key range of the bitmap index data structure;
when a current row in the first set of row results that satisfies the query criterion is marked as deletion:
querying whether the current row exists in the new main table baseline data structure;
when the current row exists in the new main table baseline data structure, deleting a bit corresponding to the current row in the first baseline SSTable result bitmap; and
when the current row does not exists in the new main table baseline data structure, deleting the current row from the first set of row results;
when the current row in the first set of row results that satisfies the query criterion is marked as insertion:
querying whether the current row exists in the new main table baseline data structure; and
deleting the current row from the first set of row results; and
an updated set of row results that satisfies the query criterion is the set of row results in the first Memtable.

17. The computer-implemented system of claim 10, wherein the operations comprise:
dividing a column value of a primary key column of the new main table baseline data structure to obtain at least two divided primary key ranges, wherein the one or more bitmap indices comprises multiple bitmap indices; and
when the query criterion is an intersection of index columns of the multiple bitmap indices, performing the query in the one or more bitmap indices based on the query criterion comprises:
when neither the bitmap index data structure nor the new bitmap index dump data structure for each of the multiple bitmap indices comprises data in a current divided primary key range,
performing the query in the current divided primary key range of the bitmap index baseline data structure for each of the multiple bitmap indices based on the query criterion to obtain a first baseline SSTable result bitmap of the current divided primary key range for each of the multiple bitmap indices;
performing a bitwise AND operation on the first baseline SSTable result bitmap of the current divided primary key range for each of the multiple bitmap indices, to obtain a second baseline SSTable result bitmap of the current divided primary key range; and
querying the new main table baseline data structure based on the second baseline SSTable result bitmap to obtain a set of row results in a second baseline SSTable of the current divided primary key range, wherein the set of row results in the second baseline SSTable is a set of second final row results of the current divided primary key range;

when the bitmap index data structure and the new bitmap index dump data structure for any of the multiple bitmap indices comprise data in the current divided primary key range, determining a set of first final row results of the current divided primary key range for each of the multiple bitmap indices based on the query criterion;

determining that the set of second final row results of the current divided primary key range is an intersection of the sets of first final row results of the current divided primary key ranges of the multiple bitmap indices; and determining that the query result is a union set of the sets of second final row results of the divided primary key ranges.

18. The computer-implemented system of claim 10, wherein the operations comprise:

dividing a column value of a primary key column of the new main table baseline data structure to obtain at least two divided primary key ranges wherein the one or more bitmap indices comprises multiple bitmap indices; and when the query criterion is a union set of index columns of the multiple bitmap indices, performing the query in the one or more bitmap indices based on the query criterion comprises:

when neither the bitmap index data structure nor the new bitmap index dump data structure for each of the bitmap indices comprises data in a current divided primary key range, performing the query in a current divided primary key range of the bitmap index baseline data structure for each of the multiple bitmap indices based on the query criterion to obtain a first baseline SSTable result bitmap of the current divided primary key range for each of the multiple bitmap indices;

performing a bitwise OR operation on the first baseline SSTable result bitmap of the current divided primary key range for each of the multiple bitmap indices, to obtain a third baseline SSTable result bitmap of the current divided primary key range;

querying the new main table baseline data structure based on the third baseline SSTable result bitmap to obtain a set of row results in a third baseline SSTable of the current divided primary key range, wherein the set of row results in the third baseline SSTable is a set of third final row results of the current divided primary key range;

when the bitmap index data structure and the new bitmap index dump data structure for any of the multiple bitmap indices comprise data in the current divided primary key range, determining the first baseline SSTable result bitmap of the current divided primary key range for each of the multiple bitmap indices, the set of row results in a first dump SSTable of the current divided primary key range for each of the bitmap indices, and the set of row results in a first Memtable of the current divided primary key range for each of the bitmap indices based on the query criterion;

performing a bitwise OR operation on the first baseline SSTable result bitmap of the current divided primary key range for each of the bitmap indices, to obtain a third baseline SSTable result bitmap of the current divided primary key range;

determining a union set of the set of row results in the first dump SSTable of the current divided primary key range of a current bitmap index and the set of row results in the first Memtable of the current divided primary key range of the current bitmap index, to obtain a set of incremental data row results of the current divided primary key range of the current bitmap index;

determining a union set of sets of incremental data row results of the current divided primary key ranges of the multiple bitmap indices, to obtain a set of incremental data row results of the current divided primary key range;

querying the new main table baseline data structure based on the third baseline SSTable result bitmap to obtain the set of row results in the third baseline SSTable of the current divided primary key range;

determining a union set of the sets of incremental data row results of the current divided primary key range and the set of row results in the third baseline SSTable of the current divided primary key range, to obtain a set of third final row results of the current divided primary key range; and determining that the query result is a union set of the sets of third final row results of the divided primary key ranges.

19. A non-transitory, computer-readable medium storing one or more instructions executable by a computer system to perform operations comprising:

determining a to-be-updated row of a bitmap index data structure and a to-be-updated row of a main table data structure based on update data;

adding row locks to the to-be-updated row of the bitmap index data structure and the to-be-updated row of the main table data structure;

updating first data in the to-be-updated row of the bitmap index data structure and updating second data in the to-be-updated row of the main table data structure based on the update data;

releasing the row lock of the to-be-updated row of the bitmap index data structure and the row lock of the to-be-updated row of the main table data structure;

writing the first data into a new bitmap index dump data structure;

writing the second data into a new main table dump data structure;

writing the second data in the new main table dump data structure into a new main table baseline data structure;

determining data in a bitmap index baseline data structure based on the new main table baseline data structure, wherein the bitmap index data structure, the new bitmap index dump data structure, and the bitmap index baseline data structure form a bitmap index; and obtaining a query result by performing a query in one or more bitmap indices based on a query criterion.

20. The non-transitory, computer-readable medium of claim 19, wherein:

the bitmap index data structure comprises a bitmap index Memtable;

the main table data structure comprises a main table Memtable;

the new bitmap index dump data structure comprises a new bitmap index dump SSTable;

the new main table dump data structure comprises a new main table dump SSTable;

the new main table baseline data structure comprises a new main table baseline SSTable; and the bitmap index baseline data structure comprises a bitmap index baseline SSTable.

21. The non-transitory, computer-readable medium of claim 19, wherein performing the query comprises performing the query in the main table data structure, the new main table dump data structure, and the new main table baseline data structure.

22. The non-transitory, computer-readable medium of claim 19, wherein the operations comprise dividing a column value of a primary key column of the new main table baseline data structure to obtain at least two divided primary key ranges, wherein performing the query in one or more bitmap indices based on the query criterion comprises:

when neither the bitmap index data structure nor the new bitmap index dump data structure comprises data in a current divided primary key range,
performing the query in the current divided primary key range of the bitmap index baseline data structure based on the query criterion to obtain a first baseline SSTable result bitmap of the current divided primary key range; and
querying the new main table baseline data structure based on the first baseline SSTable result bitmap to obtain a set of row results in a first baseline SSTable of the current divided primary key range, wherein the set of row results in the first baseline SSTable is a set of first final row results of the current divided primary key range;

when either the bitmap index data structure or the new bitmap index dump data structure comprises data in the current divided primary key range,
performing the query in the current divided primary key range of the bitmap index baseline data structure based on the query criterion to obtain the first baseline SSTable result bitmap of the current divided primary key range;
performing the query in the current divided primary key range of the new bitmap index dump data structure based on the query criterion to obtain a set of row results in a first dump SSTable of the current divided primary key range;
performing the query in the current divided primary key range of the bitmap index data structure based on the query criterion to obtain a set of row results in a first Memtable of the current divided primary key range;
querying the new main table baseline data structure based on the first baseline SSTable result bitmap to obtain the set of row results in the first baseline SSTable of the current divided primary key range;
determining a union set of the set of row results in the first baseline SSTable, the set of row results in the first dump SSTable, and the set of row results in the first Memtable, to obtain a set of first final row results of the current divided primary key range; and
determining that the query result is a union set of the sets of first final row results of the at least two divided primary key ranges.

23. The non-transitory, computer-readable medium of claim 22, wherein:

performing the query in the current divided primary key range of the bitmap index baseline data structure based on the query criterion to obtain the first baseline SSTable result bitmap of the current divided primary key range comprises:
determining, within the current divided primary key range of the bitmap index baseline data structure, a bitmap corresponding to a column value of an index column that satisfies the query criterion; and
performing a bitwise OR operation on the bitmap corresponding to the column value of the index column that satisfies the query criterion, to obtain the first baseline SSTable result bitmap.

24. The non-transitory, computer-readable medium of claim 22, wherein:

performing the query in the current divided primary key range of the new bitmap index dump data structure based on the query criterion to obtain the set of row results in the first dump SSTable of the current divided primary key range comprises:
determining a first set of row results that satisfies the query criterion in the current divided primary key range of the new bitmap index dump data structure;
when a current row in the first set of row results that satisfies the query criterion is marked as deletion:
querying whether the current row exists in the new main table baseline data structure;
when the current row exists in the new main table baseline data structure, deleting a bit corresponding to the current row in the first baseline SSTable result bitmap of the current divided primary key range; and
when the current row does not exist in the new main table baseline data structure, deleting the current row from the first set of row results;
when the current row in the first set of row results that satisfies the query criterion is marked as insertion:
querying whether the current row exists in the new main table baseline data structure; and
when the current row exists in the new main table baseline data structure, deleting the current row from the first set of row results; and
an updated set of row results that satisfies the query criterion is the set of row results in the first dump SSTable.

* * * * *